(12) United States Patent
DeWeese et al.

(10) Patent No.: US 11,070,543 B2
(45) Date of Patent: Jul. 20, 2021

(54) MULTI-PERSONA MANAGEMENT AND DEVICES

(71) Applicant: AirWatch LLC, Atlanta, GA (US)

(72) Inventors: William DeWeese, Haltom City, TX (US); Jonathan Blake Brannon, Smyrna, GA (US); Erich Stuntebeck, Johns Creek, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

(21) Appl. No.: 16/158,880

(22) Filed: Oct. 12, 2018

(65) Prior Publication Data

US 2019/0044938 A1 Feb. 7, 2019

Related U.S. Application Data

(63) Continuation of application No. 14/074,110, filed on Nov. 7, 2013, now Pat. No. 10,129,242.

(60) Provisional application No. 61/878,521, filed on Sep. 16, 2013.

(51) Int. Cl.

| | |
|---|---|
| *G06F 21/62* | (2013.01) |
| *G06F 21/74* | (2013.01) |
| *G06F 21/10* | (2013.01) |
| *H04L 29/06* | (2006.01) |
| *G06F 9/445* | (2018.01) |
| *H04W 12/37* | (2021.01) |
| *H04W 12/086* | (2021.01) |
| *G06F 1/16* | (2006.01) |

(52) U.S. Cl.
CPC .......... *H04L 63/083* (2013.01); *G06F 9/4451* (2013.01); *G06F 21/10* (2013.01); *G06F 21/62* (2013.01); *G06F 21/74* (2013.01); *H04L 63/10* (2013.01); *H04L 63/20* (2013.01); *H04W 12/086* (2021.01); *H04W 12/37* (2021.01); *G06F 1/1647* (2013.01)

(58) Field of Classification Search
CPC ........ H04L 63/083; H04L 63/10; G06F 21/62
See application file for complete search history.

(56) References Cited

U.S. PATENT DOCUMENTS

| | | |
|---|---|---|
| 5,778,060 A | 7/1998 | Otto |
| 5,857,021 A | 1/1999 | Kataoka et al. |
| 5,889,845 A | 3/1999 | Staples et al. |
| (Continued) | | |

OTHER PUBLICATIONS

"AirWatch," Jul. 23, 2012, https://web.archive.org/web/20120609111821/http://www.air-watch.com:80/solutions.
(Continued)

*Primary Examiner* — Farid Homayounmehr
*Assistant Examiner* — Suman Debnath
(74) *Attorney, Agent, or Firm* — Thomas Horstemeyer, LLP

(57) ABSTRACT

A method of installing an application on a device configured with a plurality of personas is disclosed. The method includes receiving an indication to engage a first persona of the plurality of personas. The method further includes causing an indication of the first persona to be displayed. The method further includes receiving via an interface associated with the first persona, an indication to install a first application. The method further includes causing the first application to be installed. The method further includes causing the installed first application to be associated with the first persona.

19 Claims, 10 Drawing Sheets

(56) References Cited

U.S. PATENT DOCUMENTS

| | | | |
|---|---|---|---|
| 5,974,424 A | 10/1999 | Schmuck et al. | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,327,623 B2 | 12/2001 | Watts | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton et al. | |
| 7,735,112 B2 | 6/2010 | Kim et al. | |
| 7,735,122 B1 | 6/2010 | Johnson et al. | |
| 7,739,334 B2 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,869,235 B2 | 10/2014 | Qureshi et al. | |
| 8,886,925 B2 | 11/2014 | Qureshi et al. | |
| 9,137,262 B2 | 9/2015 | Qureshi et al. | |
| 9,143,529 B2 | 9/2015 | Qureshi et al. | |
| 9,143,530 B2 | 9/2015 | Qureshi et al. | |
| 9,183,380 B2 | 11/2015 | Qureshi et al. | |
| 9,225,799 B1 | 12/2015 | Dong et al. | |
| 9,258,295 B1 | 2/2016 | Nedeltchev et al. | |
| 9,286,471 B2 | 3/2016 | Qureshi et al. | |
| 9,300,720 B1 | 3/2016 | Qiu et al. | |
| 9,378,359 B2 | 6/2016 | Qureshi et al. | |
| 9,424,554 B2 | 8/2016 | Hayton et al. | |
| 2002/0013721 A1 | 1/2002 | Dabbiere et al. | |
| 2002/0147801 A1 | 10/2002 | Gullotta et al. | |
| 2002/0156904 A1 | 10/2002 | Gullotta et al. | |
| 2003/0110084 A1 | 6/2003 | Eberhard et al. | |
| 2003/0120717 A1 | 6/2003 | Callaway et al. | |
| 2003/0204716 A1 | 10/2003 | Rockwood et al. | |
| 2004/0123150 A1 | 6/2004 | Wright et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0033722 A1 | 2/2005 | Cromer et al. | |
| 2005/0060532 A1 | 3/2005 | Dorenbosch et al. | |
| 2005/0108297 A1 | 5/2005 | Rollin et al. | |
| 2005/0246192 A1 | 11/2005 | Jauffred et al. | |
| 2006/0112416 A1 | 5/2006 | Ohta et al. | |
| 2006/0190984 A1 | 8/2006 | Heard et al. | |
| 2006/0236363 A1 | 10/2006 | Heard et al. | |
| 2006/0288229 A1 | 12/2006 | Hamid et al. | |
| 2007/0033397 A1 | 2/2007 | Phillips et al. | |
| 2007/0089111 A1 | 4/2007 | Robinson et al. | |
| 2007/0136492 A1 | 6/2007 | Blum et al. | |
| 2007/0156897 A1 | 7/2007 | Lim | |
| 2007/0174433 A1 | 7/2007 | Mendez et al. | |
| 2007/0198834 A1 | 8/2007 | Ksontini et al. | |
| 2007/0288637 A1 | 12/2007 | Layton et al. | |
| 2008/0032668 A1 | 2/2008 | Alvarado et al. | |
| 2008/0133712 A1 | 6/2008 | Friedman et al. | |
| 2008/0134305 A1 | 6/2008 | Hinton et al. | |
| 2008/0194296 A1 | 8/2008 | Roundtree | |
| 2008/0201453 A1 | 8/2008 | Assenmacher | |
| 2009/0036111 A1 | 2/2009 | Danford et al. | |
| 2009/0125632 A1 | 5/2009 | Purpura | |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0192212 A1 | 7/2010 | Raleigh | |
| 2010/0210304 A1* | 8/2010 | Huslak | G06Q 10/10 455/558 |
| 2010/0235881 A1 | 9/2010 | Liu et al. | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2010/0330961 A1 | 12/2010 | Rogel | |
| 2011/0004941 A1 | 1/2011 | Mendez et al. | |
| 2011/0082900 A1 | 4/2011 | Nagpal et al. | |
| 2011/0113062 A1 | 5/2011 | Quinlan et al. | |

(56) References Cited

U.S. PATENT DOCUMENTS

| | | |
|---|---|---|
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202269 A1* | 8/2011 | Reventlow ............ G06F 21/316 701/533 |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0054853 A1* | 3/2012 | Gupta ................... G06F 21/53 726/17 |
| 2012/0102392 A1 | 4/2012 | Reesman et al. |
| 2012/0108207 A1 | 5/2012 | Schell et al. |
| 2012/0157165 A1 | 6/2012 | Kim et al. |
| 2012/0159567 A1 | 6/2012 | Toy et al. |
| 2012/0167162 A1 | 6/2012 | Raleigh et al. |
| 2012/0198547 A1 | 8/2012 | Fredette et al. |
| 2012/0260086 A1 | 10/2012 | Haggerty et al. |
| 2013/0007245 A1 | 1/2013 | Malik et al. |
| 2013/0013727 A1* | 1/2013 | Walker .................. G06F 16/27 709/217 |
| 2013/0086684 A1 | 4/2013 | Mohler |
| 2013/0103816 A1 | 4/2013 | Morley et al. |
| 2013/0117742 A1 | 5/2013 | Newell |
| 2013/0122864 A1 | 5/2013 | Haggerty et al. |
| 2013/0130653 A1 | 5/2013 | Deasy et al. |
| 2013/0145144 A1 | 6/2013 | Newell et al. |
| 2013/0145448 A1 | 6/2013 | Newell |
| 2013/0152169 A1 | 6/2013 | Stuntebeck |
| 2013/0227636 A1 | 8/2013 | Bettini et al. |
| 2013/0254831 A1 | 9/2013 | Roach et al. |
| 2013/0290426 A1 | 10/2013 | Sorensen |
| 2013/0297700 A1 | 11/2013 | Hayton et al. |
| 2013/0298201 A1 | 11/2013 | Aravindakshan et al. |
| 2013/0305392 A1 | 11/2013 | Bar-El et al. |
| 2013/0339517 A1 | 12/2013 | Agbabian et al. |
| 2013/0347094 A1 | 12/2013 | Bettini et al. |
| 2014/0007222 A1 | 1/2014 | Qureshi et al. |
| 2014/0043136 A1 | 2/2014 | Ristock |
| 2014/0075518 A1 | 3/2014 | D'Souza et al. |
| 2014/0075573 A1* | 3/2014 | Kilday ................... G06F 21/62 726/28 |
| 2014/0096215 A1 | 4/2014 | Hessler |
| 2014/0096222 A1 | 4/2014 | Colnot |
| 2014/0101734 A1 | 4/2014 | Ronda et al. |
| 2014/0108792 A1 | 4/2014 | Borzycki et al. |
| 2014/0122720 A1 | 5/2014 | Jung et al. |
| 2014/0129714 A1 | 5/2014 | Hamdi et al. |
| 2014/0173700 A1 | 6/2014 | Awan et al. |
| 2014/0181801 A1 | 6/2014 | Voronkov et al. |
| 2014/0237621 A1 | 8/2014 | Spitz et al. |
| 2014/0259007 A1 | 9/2014 | Karaa et al. |
| 2014/0259178 A1 | 9/2014 | Karaa et al. |
| 2014/0278640 A1 | 9/2014 | Galloway et al. |
| 2014/0279454 A1 | 9/2014 | Raman et al. |
| 2014/0280817 A1 | 9/2014 | Uppalapati et al. |
| 2014/0297825 A1 | 10/2014 | Lang et al. |
| 2014/0298402 A1 | 10/2014 | Lang et al. |
| 2014/0298403 A1 | 10/2014 | Qureshi |
| 2014/0330944 A1 | 11/2014 | Dabbiere et al. |
| 2014/0330945 A1 | 11/2014 | Dabbiere et al. |
| 2014/0330990 A1 | 11/2014 | Lang et al. |
| 2014/0331297 A1 | 11/2014 | Innes et al. |
| 2014/0344420 A1 | 11/2014 | Rjeili et al. |
| 2014/0344922 A1* | 11/2014 | Lam ...................... G06F 21/629 726/19 |
| 2014/0380040 A1* | 12/2014 | Albahdal .............. H04L 9/0894 713/155 |
| 2015/0032867 A1 | 1/2015 | Lihosit et al. |
| 2015/0199533 A1* | 7/2015 | Chou Fritz ......... G06F 21/6209 707/785 |

OTHER PUBLICATIONS

"AirWatch," Jun. 8, 2012, https://web.archive.org/web/20120609111734/http://www.air-watch.com:80/ (Year: 2012).

* cited by examiner

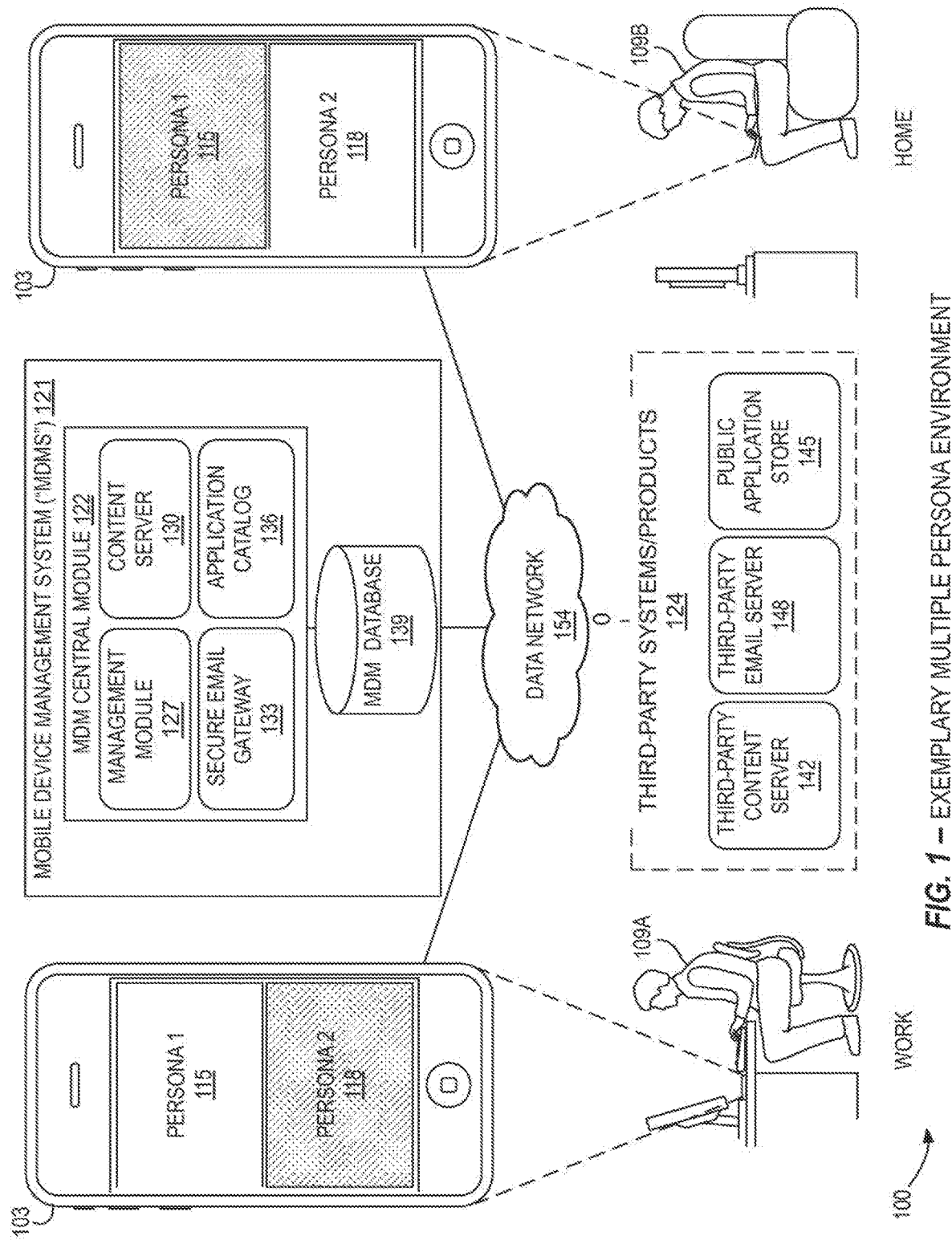
FIG. 1 – EXEMPLARY MULTIPLE PERSONA ENVIRONMENT

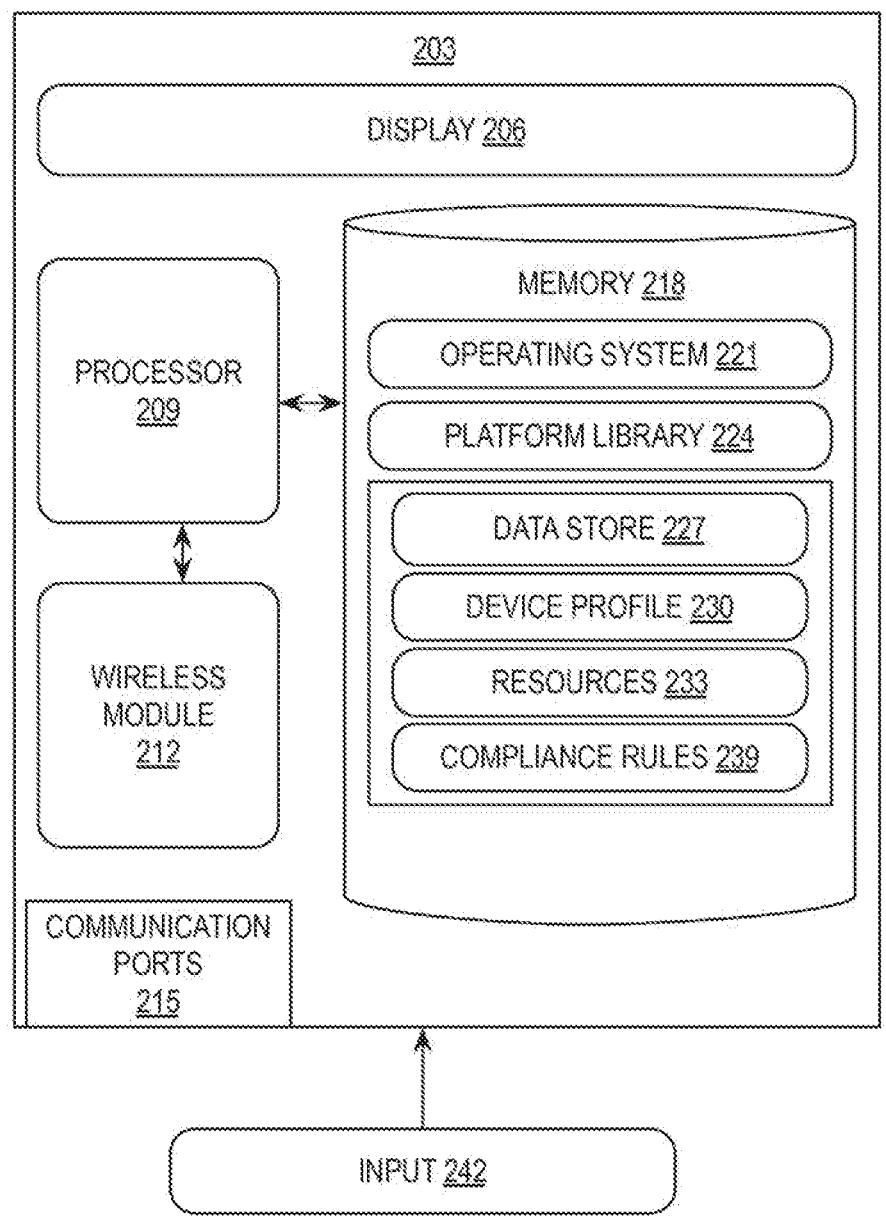
FIG. 2A – EXEMPLARY SINGLE HARDWARE USER DEVICE

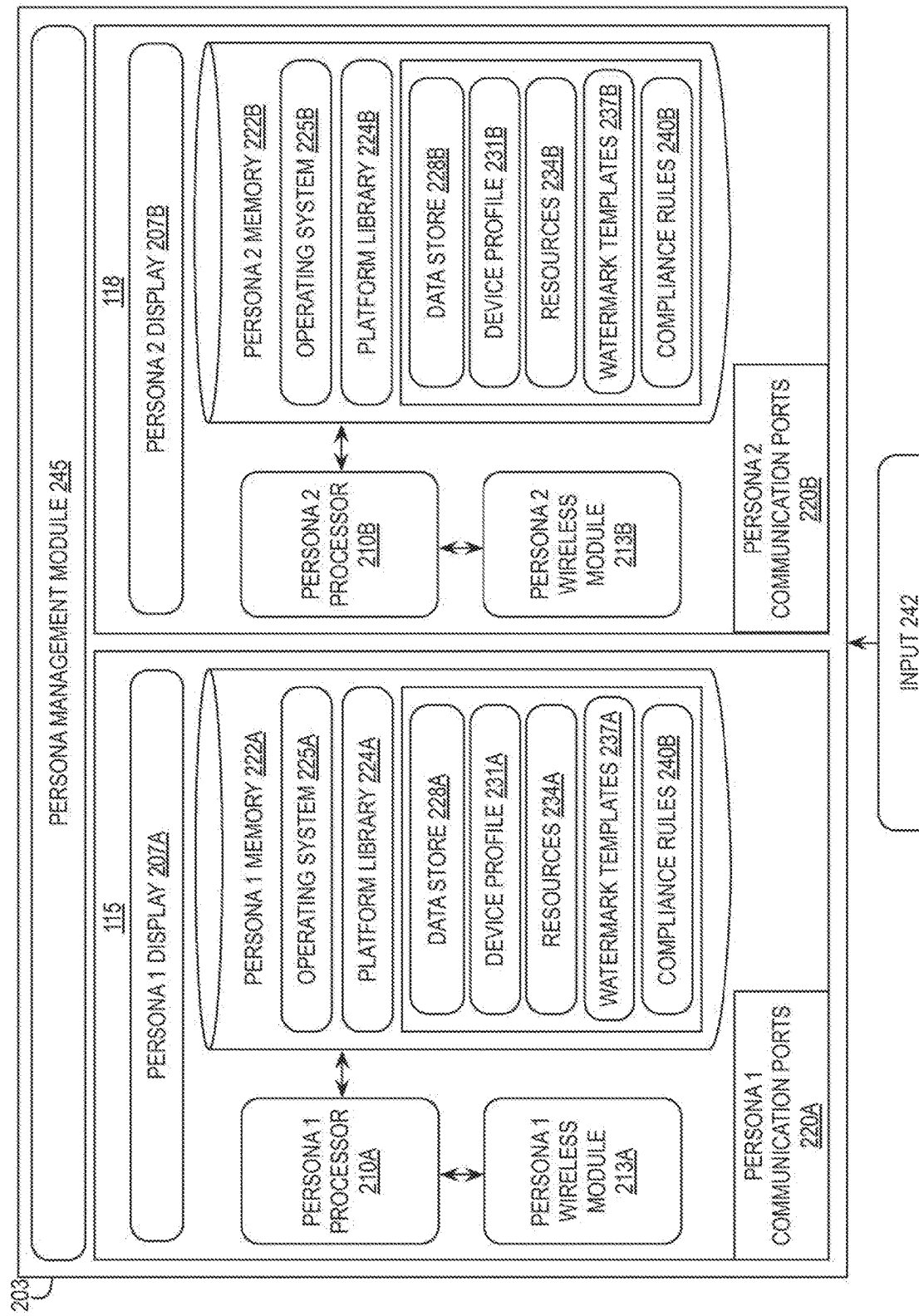
FIG. 2B – EXEMPLARY MULTIPLE PERSONA USER DEVICE

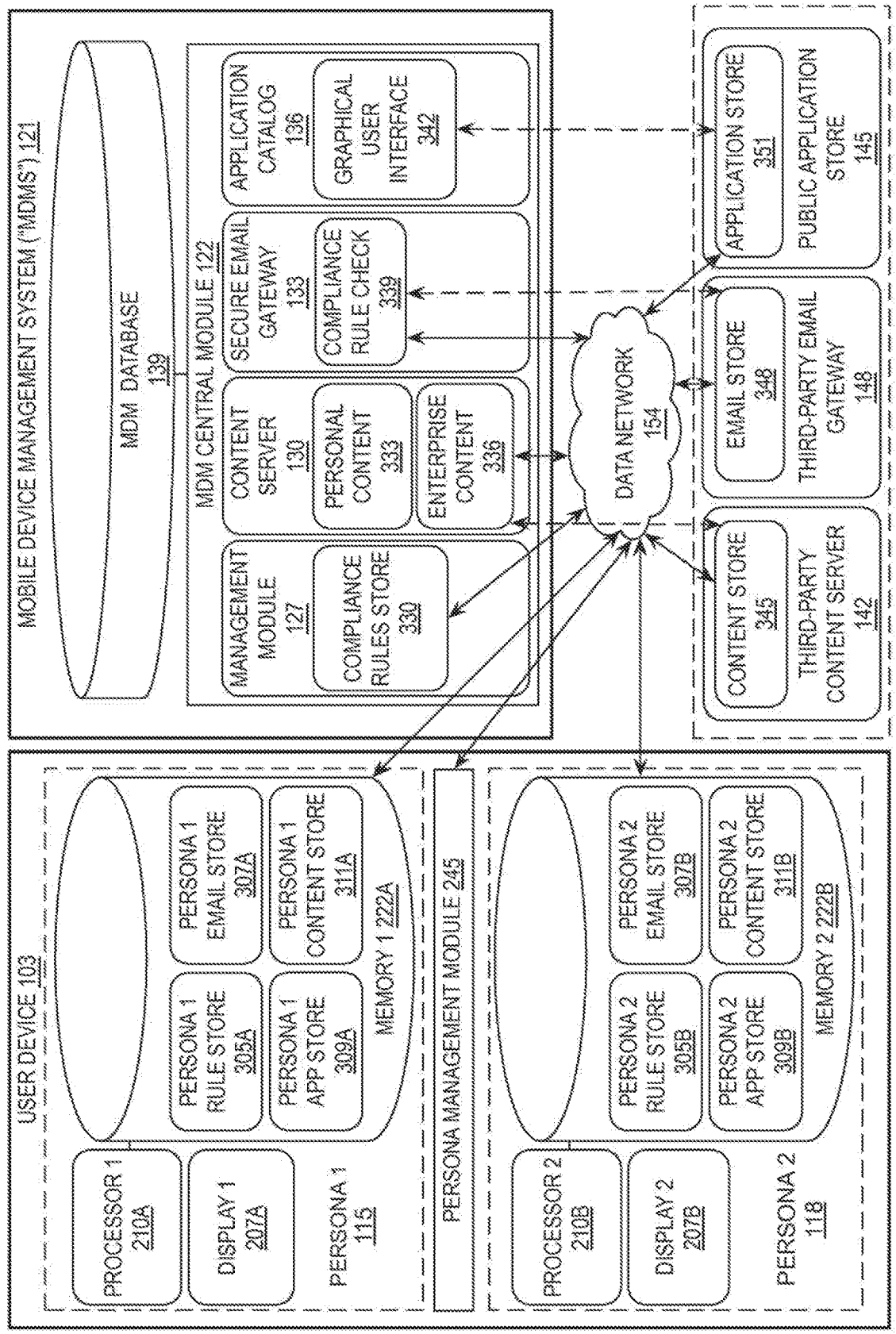
FIG. 3 – EXEMPLARY MDMS ARCHITECTURE ENVIRONMENT

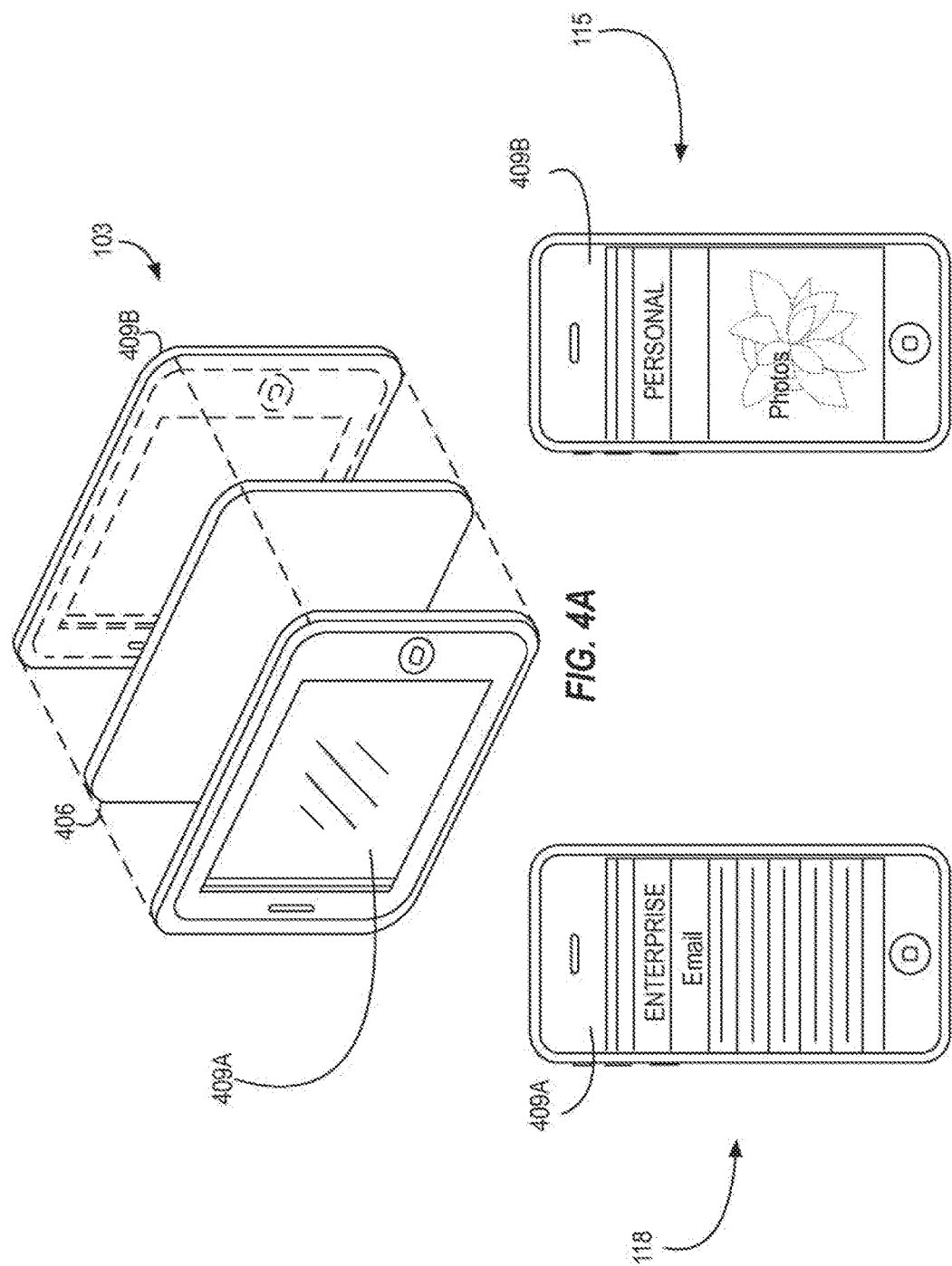

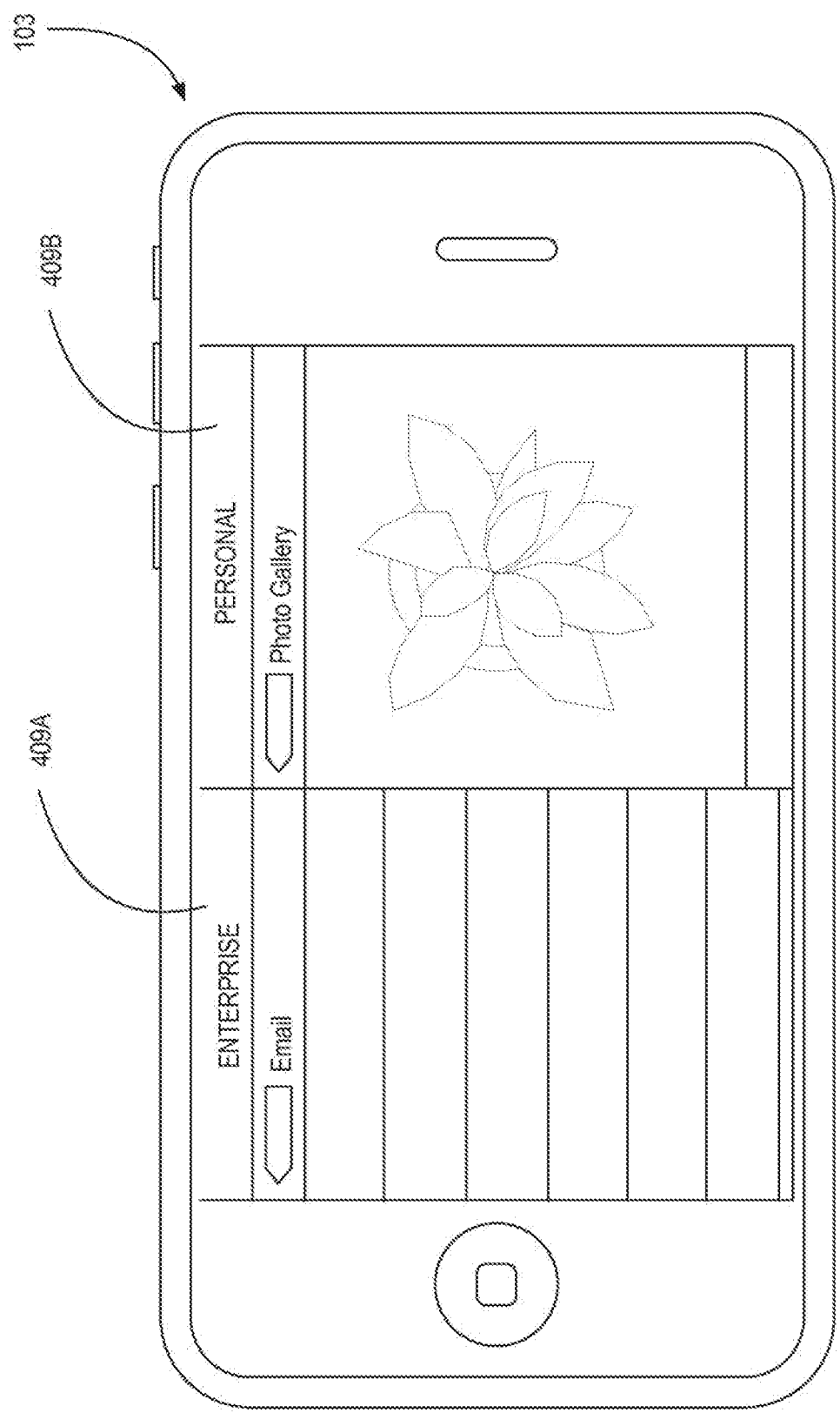
FIG. 4D – EXEMPLARY MULTI-PERSONA DISPLAY

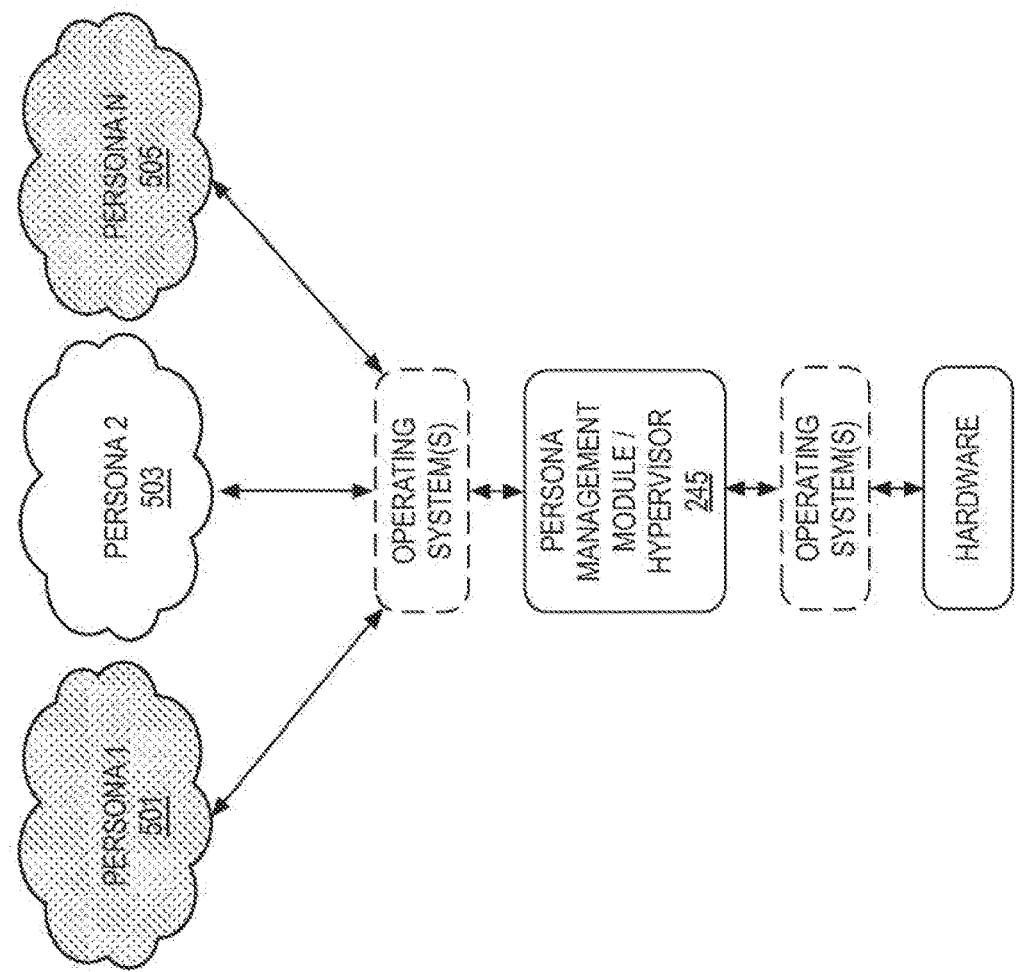
FIG. 5 – EXEMPLARY PERSONA SELECTION REPRESENTATION

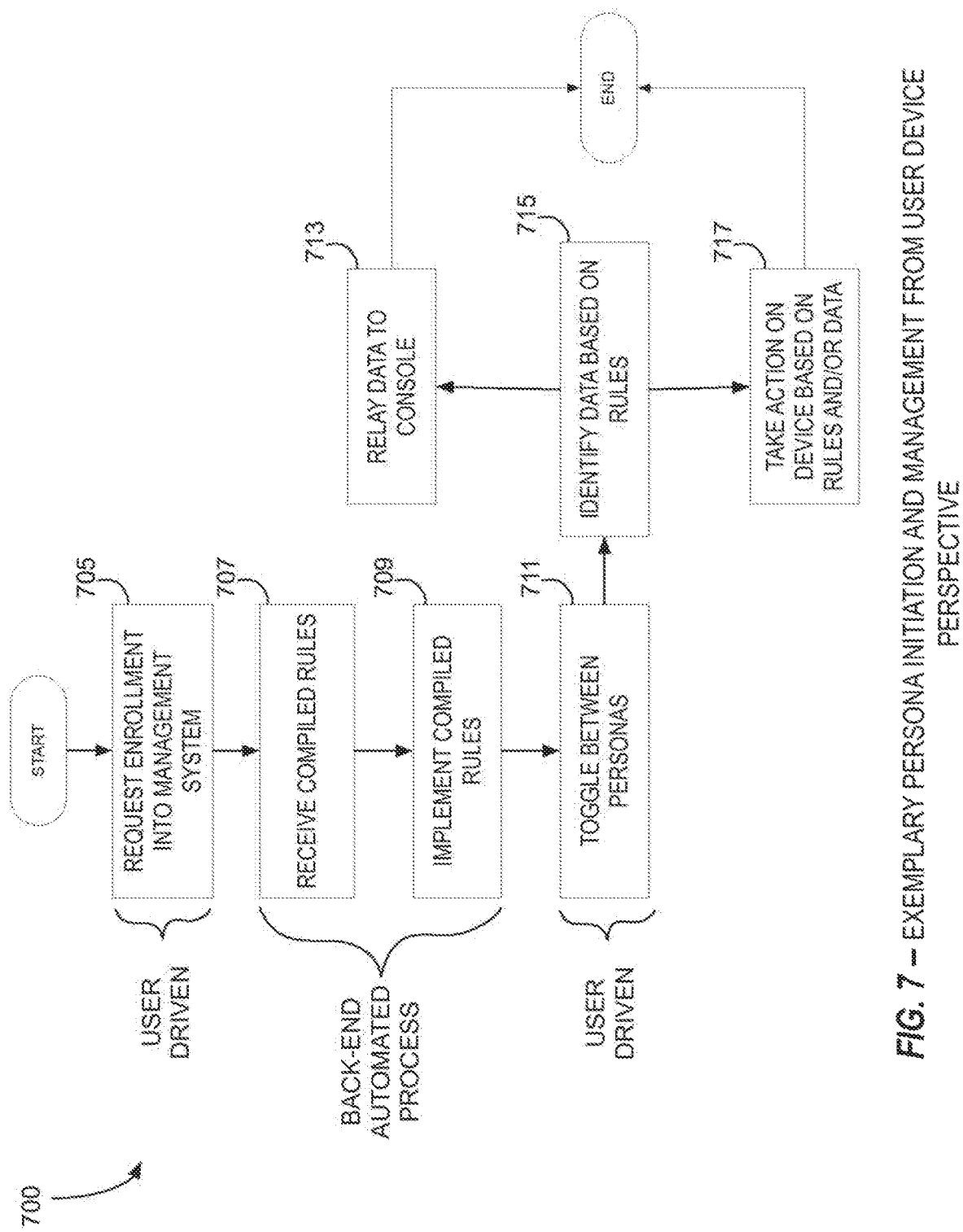

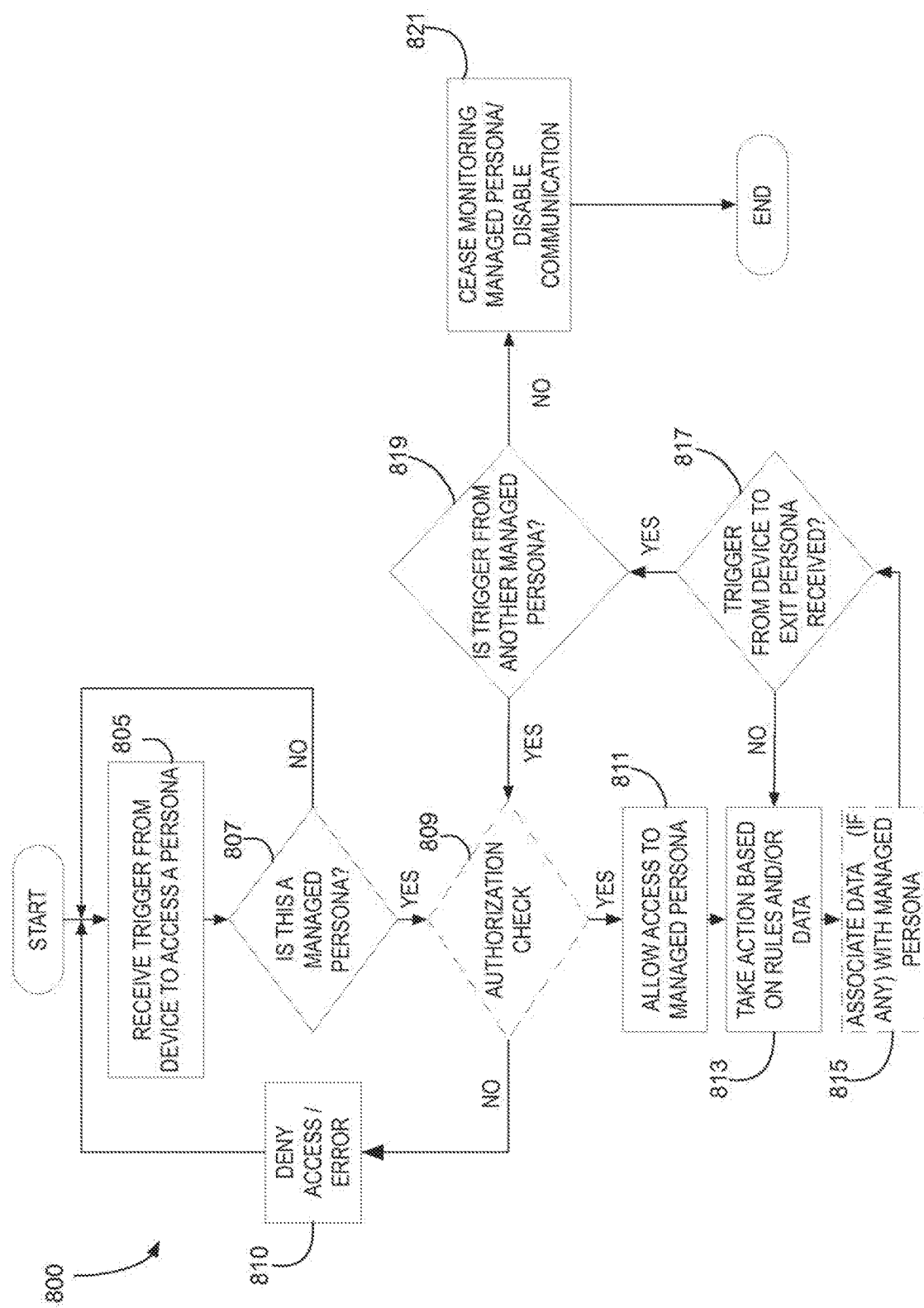

MULTI-PERSONA MANAGEMENT AND DEVICES

CROSS REFERENCE TO RELATED APPLICATION

This application is a continuation of and claims the benefit of U.S. patent application Ser. No. 14/074,110, entitled "MULTI-PERSONA MANAGEMENT AND DEVICES" and filed Nov. 7, 2013, which claims the benefit under 35 U.S.C. § 119(e) of U.S. Provisional Patent Application No. 61/878,521, entitled "Multiple Persona Mobile Devices and Methods for Managing Same" and filed Sep. 16, 2013, which are hereby incorporated by reference in their entireties.

BACKGROUND

Many individuals and employers utilize mobile devices, such as personal digital assistants, smart phones, tablets, laptops, etc., to conduct business and personal related endeavors. Today's business obligations routinely require individuals to travel, attend various meetings, and perform tasks that frequently require individuals to be out of offices and away from their computers and other devices. It is becoming increasingly important for working individuals to have a means of connecting to various enterprise resources (e.g., corporate email, Share Point sites, work documents, etc.), regardless of the person's location. Corporations want to maximize productivity while enabling workers to leave the office during business hours and maintain their necessary responsibilities. Accordingly, many companies implement solutions (e.g., providing corporate user devices to their employees, utilizing mobile device management (MDM) applications, and incorporating Bring Your Own Device (BYOD) programs, etc.) that enable employee access to corporate content on mobile user devices. Further, the proliferation of mobile devices in every aspect of life, including home and personal use, is ever present.

Companies that allow workers to access corporate networks and resources need to ensure such access is secure and sensitive material is protected from external intrusion. Providing corporate mobile devices with secure access to enterprise servers creates an efficient means of monitoring and regulating security, but this option is typically more costly for the employer with regards to wireless plans and employing sufficient IT personnel to monitor devices and server access attained by user devices. Thus, device management becomes a priority, responsibility, and obligation for the corporation. For example, if a problem occurs with a device, either hardware or software related, it is the duty of the employer to rectify the employee's need, thereby creating additional responsibilities for IT administrators and possibly a need for more IT personnel.

BYOD programs allow employees to utilize personal mobile user devices to access enterprise resources. As BYOD programs gain momentum and popularity amongst employers and employees, the concern and desire to ensure enterprise resources and personal content are kept separate grows as well. Generally, an organization's primary concerns relate to worker productivity, specific duties, and availability, while maintaining a secure and manageable user device environment. Employees appreciate the availability and convenience associated with wirelessly accessing enterprise resources and content, but desire assurance that the privacy of their personal content is upheld, even with corporate applications installed on their personal user devices.

Further, many households share personal user devices between some or all of the members of a household. Different users within the household may want personalized settings and attributes applied to the device while that particular individual utilizes the personal user device. Generally, with regards to most personal user devices, the active settings, characterizations, and attributes remain active on the personal user device until a user modifies them. Furthermore, there does not exist a mechanism to separate and containerize multiple individual internal compartments to serve as a unique repository, each exclusively assigned to one user. Therefore, in the scenario concerning multiple members of a family utilizing the same device, each time a new user engages the device, said user will be required to change the settings to their preferred configuration. Often, such actions are highly undesirable and time consuming, and leave individual users dissatisfied with the operation or configuration of the shared personal user device.

Due to the aforementioned concerns, many users retain multiple devices to maintain a separation of entities. This approach provides a complete separation of personal and enterprise matters, ensuring a company cannot access personal content. The multiple device methodology also presents a clear visual and physical indication of separation. Additionally, many families own multiple identical user devices offering the various members of the household a unique user experience. While this presents a clear separation of entities and promotes individualism, this also proves to be more costly for the family. Other conventional approaches address this problem by utilizing a containerized application on personal user devices, wherein the enterprise or alternate environment is only accessible via user initiation of the application. This approach does not offer the user an autonomous notification of incoming data in the alternate environment, nor does it present an obvious physical and visual distinction of separation.

Therefore, there is a long-felt but unresolved need to create and implement a plurality of separate entities or personas on an individual user device to preserve individualized attributes and present a clear distinction between the multiple entities. Likewise, multiple separate entities may be implemented on one individual user device ensuring enterprise data is separately, yet securely managed and preserving user's personal privacy.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Briefly described, and according to some embodiments, the present disclosure generally describes methods and systems for isolating, implementing, and provisioning multiple entities or personas on an individual user device, thus enabling multiple individual end-user environments to remain quarantined while simultaneously remaining active. As referred to herein, a "persona" generally relates to various settings, policies, rules, configurations or attributes associated with a particular end user environment. Accordingly, groups of individual personas may be categorized based on defined rules and policies applicable to said group and managed simultaneously. Other embodiments enable remote access to end user devices to deploy changes to current attributes and/or configurations either by group definition or on an individual basis.

According to example embodiment, multiple personas may be managed via a central server (e.g., a content server or management module), which may serve as an intermediary between the multiple personas. The central server receives data from the device, identifies which persona initiated the data transfer, and sends the data on behalf of the identified persona. Similarly, the control server receives data from outside sources, identifies for which persona the data is intended and pushes said data to the appropriate persona. Further, one example embodiment virtually separates one set of hardware components (e.g., a single processor memory, battery, etc.) into individual segments. Consequently, each segment houses and embodies a separate and quarantined persona. Yet other embodiments encompass multiple hardware (e.g., multiple processors, multiple memories, multiple batteries, etc.) independently coupled and dedicated for one or more respective persona.

It is to be understood that both the foregoing general description and the following detailed description are examples and explanatory only, and should not be considered to restrict the disclosure's scope, as described and claimed. Further, features and/or variation may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings:

FIG. 1 is a block diagram illustrating an embodiment of an example environment consisting of multiple personas individually represented, yet simultaneously engaged via a network to a common and unique system.

FIG. 2A is an example block diagram of a user device according to one embodiment.

FIG. 2B illustrates an embodiment of a single device comprising multiple personas, managed by a persona management module.

FIG. 3 is an example block diagram illustrating one embodiment entailing a unitary system comprising multiple personas supervised by a persona management module contemporaneously interacting with a mobile device management system and third party content via a communicatively coupled network.

FIG. 4A illustrates an example embodiment of a single user device with a screen attached to either side comprising a dual screen user device.

FIG. 4B illustrates an embodiment representing one screen of a dual screen device.

FIG. 4C is an illustration of another embodiment of another screen encompassed in a dual screen device.

FIG. 4D shows an example embodiment exhibiting multiple personas on a single screen of a user device.

FIG. 5 is a flow chart illustrating an example method of multiple personas interfacing with a singular operating system, a persona management module, hardware and the relationship therein.

FIG. 7 is a flow chart illustrating a method of a user device comprising multiple personas receiving and implementing rules from a management console.

FIG. 8 is a flow chart illustrating a method for managing data in connection with toggling personas on a user device in a multiple person environment according to one embodiment of the present disclosure.

DETAILED DESCRIPTION

Figure 6:
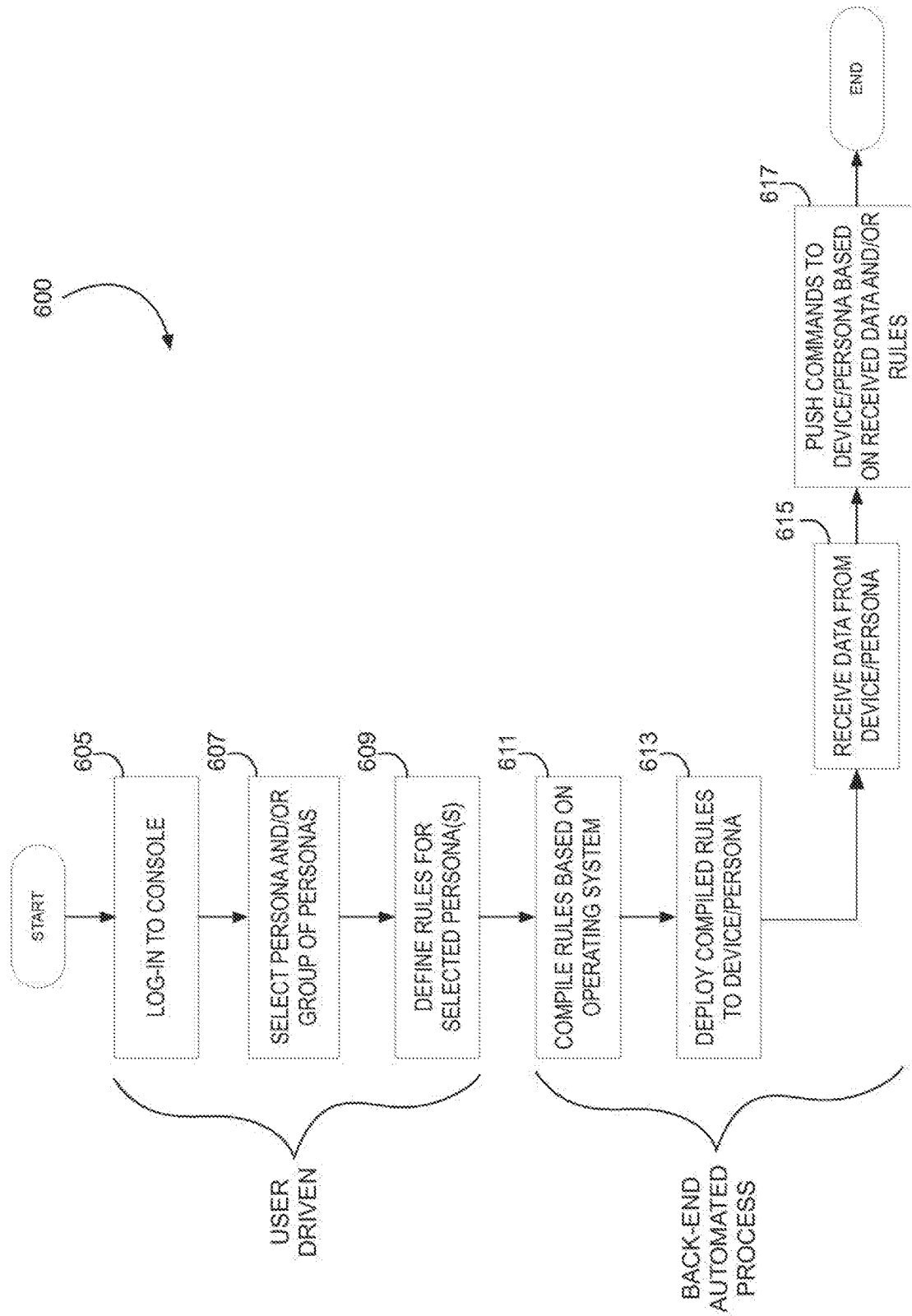
FIG. 6 is a flow chart illustrating an example method for employing persona characteristics and settings on a user device via a management console.

The following detailed description refers to the accompanying drawings. Wherever possible, the same reference numbers are used in the drawings and the following description to refer to the same or similar elements. While example embodiments of the disclosure may be described, modifications, adaptations, and other implementations are possible. For example, substitutes, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Overview

The technical effects of some example embodiments of this disclosure may include establishing control of access to networks and resources when access lists may not be predefined, and reducing and/or eliminating the burden of predefining access lists to control access to networks and resources. Moreover, the technical effects of some example embodiments may include enhancing network access control by assigning specific access rights based on access lists to client devices authorized to access associated network beacons and resources.

Other technical effects of some example embodiments of this disclosure may include offering group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

According to one example embodiment, aspects of the present disclosure relate to mobile device hardware and/or software or functionality for managing multiple personas on a given mobile device. Multiple persona device management generally comprises methods and systems for isolating, implementing, and provisioning multiple entities or personas on a single user device. Thus, enabling a persona to remain quarantined while simultaneously remaining active on the back-end of the device. As referred to herein, a "persona" generally comprises various settings, policies, rules, configurations and/or attributes associated with a particular end user environment. Accordingly, groups of individual personas can be categorized based on defined rules and policies applicable to those groups and managed simultaneously. Furthermore, some embodiments enable remote access to the personal user device to deploy changes of current attributes and configurations either by group definition or on an individual basis.

According to one example embodiment, multiple personas may be managed via a central server (e.g., a content server or management module), which may serve as an intermediary between the multiple personas. The central server receives data from the device, identifies which persona initiated the data transfer, and sends the data on behalf of the identified persona. Similarly, the central server receives data from outside sources, identifies for which persona the data is intended and pushes said data to the appropriate persona. Further, one example embodiment virtually separates one set of hardware components (e.g., a single processor, memory, battery, etc.) into individual segments. Consequently, each segment houses and embodies a separate and quarantined persona. Yet other embodiments encompass multiple hardware sets (e.g., multiple processors, multiple memories, multiple batteries, etc.) independently coupled and dedicated for one or more respective persona.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments). In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

According to one example embodiment, aspects of the present disclosure relate to mobile device hardware and/or associated software or functionality for managing multiple personas on a given mobile device. Multiple persona device management generally comprises methods and systems for isolating, implementing, and provisioning multiple entities or personas on a single user device, thus enabling a persona to remain quarantined while simultaneously remaining active on the back-end of the device. As referred to herein, a "persona" generally comprises various settings, policies, rules, configurations or attributes associated with a particular end user environment. Accordingly, groups of individual personas can be categorized based on defined rules and policies applicable to those groups and managed simultaneously. Furthermore, some embodiments enable remote access to a personal user device to deploy changes of current attributes and configurations either by group definition or on an individual basis.

According to one example embodiment, multiple personas may be managed via a central server (e.g., a content server or management module), which may serve as an intermediary between the multiple personas. The central server receives data from the device, identifies which persona initiated the data transfer, and sends the data on behalf of the identified persona. Similarly, the central server receives data from outside sources, identifies for which persona the data is intended and pushes said data to the appropriate persona. Further, one example embodiment virtually separates one set of hardware components (e.g., a single processor, memory, battery, etc.) into individual segments. Consequently, each segment houses and embodies a separate and quarantined persona. Yet other embodiments encompass multiple hardware sets (e.g., multiple processors, multiple memories, multiple batteries, etc.) independently coupled and dedicated for one or more respective persona.

Multiple persona device management generally relates to the implementation and management of a plurality of personas on a singular user device to segregate and quarantine a set of attributes relating to a singular persona from other personas accessible on the same user device. A persona may comprise a collection or group of data sets, configurations (assignment of resources, policies, rules, etc.), appearances, particular functionality, branding, billing parameters, physical components, and/or preferences with which a user device or a portion of a user device is associated. There exists a plurality of embodiments regarding multiple persona device management implementations, which may be executed on an individual user device, offering different mechanisms for a user possessing the desire to access divergent sets of attributes while maintaining a separation of said attributes. An example embodiment of multiple persona device management involves the ability, at an end user's discretion, to toggle between the various personas. Furthermore, the device may autonomously toggle between personas or present the option to toggle between personas based on predetermined triggering events embedded within the multiple persona device management technology.

One example of implemented multiple persona device management comprises a family owning a single tablet device consisting of exclusive personas representing each family member. Thereby, each family member retains a unique set of applications, settings, and customizations associated with his or her respective persona. Another example entails a user device enrolled in a BYOD program in a work setting in which a mobile device management system merges multiple personas. The user device can separate an enterprise persona for receiving, accessing, and distributing corporate content and a personal persona for maintaining interaction with personal matters as shown in FIG. 1.

Example Embodiments

Generally, multiple persona management on a mobile device, according to aspects of the present disclosure, can be divided into at least two broad categories: (1) physical persona separation via either multiple physical components within a single mobile device, and/or (2) virtual persona separation via virtual division of components, data segregation or the like. As described in greater detail below, physical separation may include a device with multiple screens, multiple processors, multiple memories, etc. Generally, the virtual separation embodiments provide a virtual separation of components (e.g., virtual processors), or a data separation coupled with some visual or audible separation designation, or the like. These aspects and others will be described in greater detail below.

FIG. 1 illustrates an example environment 100 comprising a single user device employing multiple personas (this example exhibits dual personas, but as will be understood and appreciated by one skilled in the art, one may elect to employ any number of personas on a single user device), an end user, and two separate hypothetical end user environments. Throughout this disclosure, an example of "two persona" or "dual persona" device management will be used for example purposes in connection with the presented Figures, but as will be understood by one of ordinary skill in the art, the example of dual persona device management is presented for example purposes only and any number of personas may be implemented on a user device 103. As shown, enterprise end user 109A is capable of accessing and conducting enterprise matters, such as reading and creating corporate email, viewing and editing documents, accessing content via Share Point, and matters of the like, on a persona 2 118 segment of the individual user device 103. Persona 2 118 exemplifies the corporate partition of a dual persona device 103 with multiple persona device management applied to the user device 103. This may be the primary active persona during working hours or while a GPS recognizes the end user's location to be in a corporate building or office. In some embodiments, although the enterprise workspace is the primary active persona, a personal persona 1 115 is still active on the back-end of the multiple persona device management system (or on the device 103 itself) and is simultaneously receiving and transmitting data intended for persona 1 115.

Alternatively, as seen in FIG. 1, the illustrated embodiment represents the same user 109B utilizing the same user device 103 in a personal environment (e.g., at home, in a restaurant, or other location away from the office). Generally, a persona 1 115 relates to the personal end user environment of the user 109B in which all personal data (e.g., phone calls, text messages, non-enterprise email, personal applications, personal web browsing data, etc.) is distinctly routed and stored. The independent persona 1 115 allows an end user 109B to maintain user device functionality in accordance with personal settings, characteristics and attributes separately from enterprise-related data and functionality.

In one embodiment shown in FIG. 1, a data network 154 enables operative connections between persona 2 118, persona 1 115, third-party systems and products 124, and a mobile device management system (MOMS) 121 for routing data amongst the involved entities. A data network 154 may comprise a wireless IEEE 802.b,g,n network, a cellular wireless network, Bluetooth technology, etc. Although the aforementioned represent typical communication systems, it will be understood by one of ordinary skill in the art that other signal carrying data propagation mechanisms could be utilized for communication between the different entities.

The described mobile device management system (MOMS) 121 empowers enterprises to securely monitor, manage, and support a plurality of devices via wireless deployment of data configurations, applications, settings, permissions, and policies. Enterprises may deploy an MDMS 121 on a plurality of devices, such as mobile phones, smart tablets, laptops, etc., to ensure secure wireless access and distribution of corporate content. Further, enterprises utilize the MDMS 121 for managing third-party content accessibility on enterprise user devices. While these restrictions on enterprise content would not be objectionable to most users, some may object to applying the same restrictions to personal user devices. Therefore, multiple persona device management as described herein supports the notion of segregating managed, secure mobile access to enterprise content to an enterprise persona while personal matter immunity is maintained on personal personas.

Still referring to FIG. 1, the shown MDMS 121 comprises a mobile device management (MOM) database 139 and a MDM central module 122. The MDM database 139 generally contains attributes typically monitored, modified, and manipulated by an administrator, as well as information necessary for the use of the multiple persona functionality. The MDM central module 122 comprises a management module 127, content server 130, secure email gateway 133, and application catalog serving as separate entity portals for pushing and deploying configured attributes to end user devices. The individual modules within the MDM central module 122 are communicatively coupled with the MDM database 139 and the user device 103, thereby ensuring proper attributes defined by an administrator are effectively enforced on applicable personas. Further, the MDM database 139 and the MDM central module 122 generally represent the enterprise controlled server-side of the of the multiple persona device management application.

In one example embodiment of the present system, the management module 127 (also called the admin console) recognizes a plurality of individually assigned personas associated with a plurality of user devices. An administrator can aptly engage the management module 127, select a persona on a user device or group of personas on different user devices, and define rules and characterizations for the selected user devices. Accordingly, the management module 127 determines which policy is applicable to particular personas and subsequently distributes said policy to the appropriate personas on a given user device. In some embodiments, the management module 127 recognizes and addresses different operating systems embodied on user devices, thereby defining proper enforcement of rules and access to non-native data. (Details regarding the various processes carried out by the management console will be described in greater detail in connection with FIG. 3.)

According to one embodiment illustrated in FIG. 1, a content server 130 of the MDM central module 122 serves as an access portal for various enterprise related subject matter parsed in separate partitions for access and distribution by identified personas. The content server 130 integrates and interacts with the management module 127, which supports persona access, policies, and rules regarding authorization to corporate (or other managed) content. The content server 130 generally, but may not necessarily, comprises one or more local servers, cloud servers, and/or offsite servers. In the embodiment shown, persona 2 118 engages with enterprise subject matter on the user device 103 in the enterprise environment when operated by the end user 109A. Alternatively, persona 1 115, exhibiting an unmanaged personal persona, may be precluded from accessing to corporate content and subsequently denied rights to the content server 130. Further, in some embodiments, the MDMS 121 has no access to or control over persona 1 115.

It is well known and understood by those of ordinary skill in the art that many corporate entities utilize enterprise dedicated electronic mail systems whereby traffic is regulated through a managed email portal (e.g., Microsoft Exchange). Accordingly, the presently-described embodiment includes a secure email gateway 133 that enables secure email access and distribution through the data network 150 within a corporate email exchange. In one example embodiment, the secure email gateway 133 behaves as a proxy server linking the enterprise email server and the data network. The coupled management module 127 has the ability to push enterprise policies set by an administrator to the secure email gateway 133 to enforce said enterprise policies.

Further, some embodiments of the MDM central module 122 comprise an application catalog 136 that is also integrated with the management module 127. The application catalog 136 supports access to applications both enterprise specific applications and public applications. The enterprise persona 2 118 through the encapsulated rules and policies as set forth by an administrator sends requests to access and download applications to the application catalog 136. To increase mobile productivity, the application catalog 136 serves as a portal governed by enforced policies to allow approved access to applications for a user's benefit.

Generally, users 109 utilize a variety of third-party systems, applications, and email platforms via their personal user devices 103. Often access to third party content is not as secure as most enterprise platforms and presents vulnerabilities concerning a device that can also access enterprise content. As illustrated in FIG. 1. third-party systems and products 124 grant end-user access to third-party content through the data network 154. In some embodiments, the public application store 145 permits users to access a plurality of third party applications. In some examples, an enterprise may preclude the enterprise persona, persona 2 118, from accessing all outside applications. In such a scenario, an end user 109 still retains the ability to install and utilize outside applications on the personal persona (persona 1 115). Third-party email servers 148 may provide persona 1 115 access to personal emails. Other third-party content is pulled through the third-party content server 142. In another embodiment, this content may be accessed by the enterprise persona 2 118 and the personal persona 1 115 depending on the current configuration the administrator has implemented on the user's device.

The discussions above in association with FIG. 1 are merely intended to provide an overview of an embodiment of the present system for multiple persona management on a mobile device utilizing a separation of hardware and/or software. Accordingly, it will be understood that the descriptions in this disclosure are not intended to limit in any way the scope of the present disclosure. Various embodiments regarding hardware and software implementations of the present device will be described next in greater detail.

FIG. 2A is a block diagram of a user device 103 comprising a processor 209 and a memory 218. The user device 103 shown in FIG. 2A is a representative "single component" device, i.e., the device does not include multiple hardware components for each respective persona. An example multiple-persona hardware device is shown in FIG. 2B. Depending on the configuration and type of device, memory 218 may comprise, but is not limited to, volatile (e.g. random access memory (RAM)), non-volatile (e.g. read-only memory (ROM)), flash memory, or any combination. Memory 218 may store executable programs and related data components of various applications and modules for execution by user device 103. Memory 218 may be coupled to processor 209 for storing configuration data and operational parameters, such as commands that are recognized by processor 209.

Basic functionality of user device 103 may be provided by an operating system 221 contained in memory 218. One or more programmed software applications may be executed by utilizing the computing resources in user device 103. Applications stored in memory 218 may be executed by processor 209 (e.g., a central processing unit or digital signal processor) under the auspices of operating system 221. For example, processor 209 may be configured to execute applications such as web browsing applications, email applications, instant messaging applications, and/or other applications capable of receiving and/or providing data.

Data provided as input to and generated as output from the application(s) may be stored in memory 218 and read by processor 209 from memory 218 as needed during the course of application program execution. Input data may be data stored in memory 218 by a secondary application or other source, either internal or external to user device 103, or possibly anticipated by the application and thus created with the application program at the time it was generated as a software application program. Data may be received via any of a plurality of communication ports 215 of user device 103. Communication ports 215 may allow user device 103 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 103 may also receive data as user input via an input component 242, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 218 by the processor 209 during the course of application program execution. Data may be provided to the user during application program execution by means of a display 206. Consistent with embodiments of this disclosure, display 206 may compose an integrated display screen and/or an output port coupled to an external display screen.

Memory 218 may also comprise a platform library 224. Platform library 224 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 103 may also include additional data storage devices (removable and/or non-removable) such as, for example, magnetic disks, optical disks, or tape (not shown).

User device 103 may comprise a desktop computer, a laptop computer, a personal digital assistant, a cellular telephone, a smartphone, a set-top box, a music player, a web pad, a tablet computer system, a game console, a mobile device, and/or any other device with like capability.

User device 103 may store in a data store 227 a device profile 230 and a plurality of user preferences 233. Device profile 230 may comprise an indication of the current position of user device 103 and/or indications of the hardware, software, and security attributes which describe user device 103. For instance, device profile 230 may represent hardware specifications of user device 103, version and configuration information of various software program and hardware components installed on user device 103, data transmission protocols enabled on user device 103, version and usage information of various resources stored on user device 103, and/or any other attributes associated with the state of user device 103. The device profile 230 may further comprise data indicating a date of last virus scan of user device 103, a date of last access by an IT representative, a date of last service by the IT representative, and/or any other data indicating maintenance and usage of user device 103. Furthermore, the device profile 230 may comprise indications of the past behavior of associated users, such as resources accessed, charges for resource accesses, and the inventory accessed from such resources. User preferences 233 may comprise a listing of factors that may affect the experience of the user. In particular, user preferences 154 may include indications of the user's age, gender, bodily traits, preferred resource types, preferred venue resources, and combinations thereof.

FIG. 2B is a block diagram of a user device 103 with multiple personas. As shown, these personas may either be physical (multiple hardware components) or virtual. In some embodiments, the user device 103 is embedded with dual persona device management. According to some embodiments illustrated in FIG. 2, there are two processors 210A and 210B, two wireless modules 213A and 213B, two communication ports 220A and 220B, two displays 207A and 207B, and two memory components 222A and 222B. Again, these dual processors can either be physical (e.g., two physical processors) or virtual (e.g., a single processor that is virtually divided via management software).

In some embodiments, a persona may comprise a "SIM persona" that is managed on a back-end and is portable to other devices. A "SIM persona" may comprise a physical SIM card, it may comprise a virtual SIM card entity, or a virtual entity embedded on a user device 103. In another embodiment, several SIM personas may be implemented on a single device. A SIM card may possess one persona or multiple personas wherein the card is virtually split into separate representative entities containing the attributes and characterizations of the given personas. For the example wherein a SIM card contains one sole persona, an end user may carry multiple SIM cards and exchange them within the user device 103 based on location or time. In another embodiment, a user device 103 may have the capability to support more than one SIM card simultaneously, maintaining persona 1 115 on one SIM card and persona 2 118 on another SIM card. In such an embodiment, as information travels through the data network 154, the information subsequently propagates to the appropriate SIM card inside the user device 103.

In some embodiments, an overarching process determines the routing of incoming data to the user device 103. According to some embodiments of dual persona device management, a persona management module 245 is employed to decide to which persona content should be delivered on the device. The persona management module 245 exercises back-end differentiations between shared and distinct features and/or functionality among personas. In some embodiments, an agent resides on the dual persona implemented user device 103 for management of resources in connection with different personas. For example, a hypervisor may serve as a persona management module 245 and embody a centralized means to deliver data to the appropriate persona. The user device 103 hence becomes a host machine on which the hypervisor resides and controls the related functionality in part or completely. The hypervisor creates "guest machines" or virtual machines on the user device 103 enabling the virtual machines to behave as their own separate operating system comprising their own persona. The hypervisor can represent a firmware, software, or hardware implementation wherein the input data and output data is recognized, identified and pushed by the hypervisor to its appropriate destination.

For example purposes and as illustrated in this disclosure, persona 1 115 is as shown as personal persona and persona 2 118 is shown as an enterprise persona. Thus, as a corporate email transmits to the user device 103, the hypervisor recognizes the data as enterprise communication (based on lags or identifiers in the data), and subsequently routes the data to persona 2 118. In some embodiments, policies implemented with multiple persona device management are identified by an administrator and pushed to the hypervisor, allowing the hypervisor to act as the decision-making agent performing actions as the persona management module 245.

According to the embodiment illustrated in FIG. 2B, a device 103 may contain multiple hardware sets, each set corresponding to one unique persona. In the example comprising dual persona device management, the device 103 comprises two components of each hardware portion (e.g., two physical processors 210A and 210B, two physical memory sets 222A and 222B, two wireless modules 220A and 220B, etc.). Generally, persona 1 115 transmits its corresponding data through a persona 1 wireless module 213A, thereby leaving the interpretation end data storage respectively to the persona 1 processor 210A and the persona 1 memory 222A. Likewise, a similar process transpires for persona 2 115 comprising its separate processor 210B, memory 222B and wireless module 213B. In some embodiments, a central process encapsulated in the persona management module 245 governs and routes the data and information transmitted to the user device 103 to the appropriate hardware set. Some embodiments comprise a combination of dual components and single components. For example, in some embodiments, a user device comprises two processors 210A and 210B, two sets of memory 222A and 222B, one wireless module 220, and one communication port.

In some embodiments, the persona management module 245 integrates the policies and rules set by the administrator through MOMS and precludes access and distribution of data for particular personas. For example, if a policy is set which does not allow third-party email exchange access by persona 2 118, when a request for access has propagated to the persona management module 245, the request may be denied and the proper executable steps are initiated.

Further, as shown in FIG. 2B, one example embodiment of the device 103 may be constructed such that all hardware sets are entirely independent of each other with no overarching agent software or firmware. In this embodiment, there may exist two independent SIM cards, each associated individually with each hardware set therefore containing the appropriate SIM card address for each persona. The address of the SIM card is coupled with the transmitted data; hence, the persona identified by the address receives the appropriate information. According to one example embodiment, different hardware sets may utilize different operating systems. For example, the personal persona, persona 1 222A, may utilize iOS for its operating system 225A and the enterprise persona, persona 2 222B, due to a corporate or enterprise preference, may utilize a version of Android as its operating system 225B. In an application with dual, independent operating systems, the persona management module 245 may contain an agent application for communicating and pushing data to the Android operating system 222B and a separate application programming interface (API) corresponding with the iOS operating system. Associated with the independent operating systems, an independent device profile 231A and 231B may be associated with each respective device, and may contain information such as operating system versions, last update of said operating system, serial numbers associated with an operating system, etc. Further, the independent hardware sets may also comprise divergent network carriers integrated on the same user device 203.

Also illustrated in FIG. 2B is an embodiment comprising dedicated communication ports 220A and 220B for each persona. The communication ports could consist of keyboard, mouse, power adapter, Ethernet port, or the like. Alternatively, in some embodiments, all components of hardware may be separate, but share a power source or common battery.

In some embodiments of the present disclosure wherein multiple hardware sets are implemented on the user device 103 and as illustrated in FIG. 2B, respective compliance rules 240A and 240B serve as the local user device 103 containers for compliance rules which have been pushed and implemented in connection with individual personas. In some embodiments, policies and rules incorporated in the enterprise compliance rules 240B engage with the persona 2 210B processor, governing incoming data via the persona 2 wireless module 213B, ensuring the policies and rules set forth by the enterprise maintain consistency and integrity. Also, within the quarantined memories of persona 1 222A and persona 2 222B, an embodiment of separated data stores 228A and 228B store respective persona characterizations. For example, persona 2 118 may store in its data store 228B preferences, persona usage details, enterprise branding information, configurations, and assignments of resources accessible to an administrator using MDMS 121. The stored data within the data store 228B enables an enterprise to access information to effectively monitor user device operation within the enterprise space.

According to some embodiments, a user device 103 may comprise various combinations of a plurality of components. For example, in some embodiments the user device comprises dual screens that are independently assigned to a persona. In some embodiments of the present disclosure, the user device 103 may comprise separate controls for each screen or each persona. Each independent set of controls may be embedded and assigned to manipulate actions within their designated persona. Another embodiment comprises a user device housing or form that will fit additional add-on components to expand or further facilitate the persona within the user device. One example comprises a keyboard comprising a toggle button that can engage the desired persona when the button is depressed or moved to a designated position. Further, a user device may comprise a combination of embodiments (e.g., common controls that manipulate dual screens, dual controls dedicated to one screen, etc.).

Referring now to FIG. 3, an example block diagram is shown of a MDMS 121 architecture environment interacting with a data network 154, third party systems and products 124, and a user device 103 configured with dual persona device management. For discussion purposes, it can be assumed that the illustrations in FIG. 3 relate to a user device 103 involved in a Bring Your Own Device (BYOD) program and coupled with a mobile device management system (MDMS) 121. As will be generally understood and appreciated by one of ordinary skill in the art, an enterprise BYOD program is not necessarily the only application with the ability to benefit from multiple persona device management, and the intention of the following example is not intended to necessarily limit or restrict the scope and spirit of the present disclosure in any way. As previously described, the MDMS 121 enables an administrator to create compliance rules and subsequently distribute those rules to a plurality of user devices to which the rules pertain. Further, the user devices may contain a personal persona, persona 1 115, and an enterprise persona, persona 2 118, with (or without) a centralized governing agent, the persona management module 245.

In some embodiments, the system illustrated in FIG. 3 promotes a back-end differentiation between shared and distinct functionality amongst a plurality of personas. In connection with the back-end differentiation, some embodiments include a resident agent such as the persona management module 245 residing on the multi-persona device 103. As previously described, the persona management module 245 manages distinct and shared resources associated with data entering or exiting the user device. For example, as persona 1 115 requests access to the email store 348 within the third-party email gateway 348, the persona management module 245 acknowledges persona 1 118 as the personal persona and allows access to third-party content such as the third-party email gateway 148.

In some embodiments, the management module 127 in the MDMS 121 may push policies to some or all personas, specifying shared resources among personas and setting boundaries regarding the permitted level of communication among the personas. Yet according to another embodiment, the management module 127 may also push personal policies, enterprise policies, and meta-policies between the personas. Generally, meta-policies govern the shared resources, communication, and device-level functionality among the personas. The recently discussed embodiments exemplify different means of creating a native experience for the end user, where data intended for a specific persona is identified either before reaching the user device or upon reaching the user device and transferred to the appropriate persona within the user device.

In some embodiments illustrated in FIG. 3, the MDM central module 122 includes the various modules an administrator utilizes to set functionality, configurations, appearances, preferences and various other attributes that are controlled and implemented with a MDMS 121. According to an embodiment of the present disclosure, the MDM database 139 houses the attributes utilized by the administrator via the MDMS user interface. In other embodiments, various modules within the MDM central module 122 engage with the MDM database 139 to retrieve an appropriate attribute(s) selected by the administrator and push said attribute(s) via a data network 154 to the persona management module 245. The persona management module 245 recognizes the attribute(s) and the persona for which it is intended, thereby pushing that attribute(s) to the appropriate persona. In another embodiment, the MDM central module 122, through the management module 127, pushes appropriate attributes to dedicated SIM cards within a user device embodying multi-persona device management.

Generally, in connection with the functionality of the management module 127, operations may be broken into two different spaces—a server side and a device side. As will be discussed later in the present disclosure in connection with FIG. 6, the server side of the management module 127 enables an administrator to log into the console, select a device or group of devices, compile rules for said device and push the policies and the rules to the user device 103 to control subsequent functionality of those devices. In another embodiment, the management module 127 may authenticate data by verifying the credentials of the user device 103, interpret said data and push commands back to the user device 103 in response to the commands received from the user device. The device side of the management module 127 enables a user device to request enrollment into a mobile device management system, receive compiled rules and policies, take actions in conjunction with receiving data from the management module 127, and toggle among active personas within the user device 103.

In some embodiments (not shown), the management module 127 also contains a self-service application that is available for utilization by device users. In some embodiments, the self-service application comprises a user interface that is a pared-down version of the administrator management console interface. Users may log into the self-service application and view specific information about the enterprise persona, persona 2 118, of the device and/or the personal persona, persona 1 115. In another embodiment, users may only access the enterprise persona, while being unable to view the content of the personal persona. In some embodiments, the self-service application comprises a limited set of mobile device management options available to the user. For example, users may acquire the GPS location of the user device 103, lock the user device 103, perform an enterprise wipe or wipe the entire user device 103, send messages to said device, etc. In another embodiment, the enterprise wipe may de-partition the user device 103 and leave the personal persona as the only remaining persona. An enterprise wipe is a function wherein all enterprise data, characterizations, enterprise attributes, preferences, and settings are remotely erased from the enterprise persona. Likewise, an entire device wipe remotely erases all data on both persona 1 115 and persona 2 118, reverting the device to its original OEM state. In the self-service application of the management module 127, a user does not have the ability to assign or change rules and policies with respect to any managed persona. In some embodiments, the self-service feature offers users the ability to track user content or their user device and minimally manage the user device.

Further, another embodiment of the self-service application enables the management module 127 to configure a pre-defined limited set of options relating to multiple virtual hardware sets. In the instance where the management module 127 transmits commands to the user device 103 to create multiple virtual hardware sets, an end-user may log into the self-service section of the management console and access the pre-defined functionalities related to the multiple virtual hardware sets. As previously described, the self-service component of the management module 127 enables users to access an interface and view specific data concerning their user device 103 and respective personas 115 and 118.

According to one embodiment shown in FIG. 3, the management module 127 compiles rules and policies via the compliance rule store 330 and pushes those rules and policies to a user device 103 to create a determined number of virtual hardware sets. In some embodiments, there are two hardware sets corresponding to two personas. In the example shown in FIG. 3, each hardware set comprises separate displays 207A and 207B, separate processors 201A and 201B, and separate memories 222A and 222B. In some embodiments, each memory 222A and 222B comprises storage functionality that contains data respective to the persona with which it belongs. Generally, each display 207A and 207B is the respective user interface that a user 109 would use to access and perform operations pertaining to the respective persona. In some embodiments, displays may be interchangeable and a user has the ability to toggle between displays according to the persona the user wishes to engage. For example, a user wishing to perform a function regarding persona 1 115 would toggle to display 1 207A, access contents in memory 1 222A through processor 1 210A and execute some desired actions. After the desired actions are complete, the end-user may keep persona 1 115 active or toggle to another persona.

Still referring to FIG. 3, in some embodiments, the management module 127 directs configuration policies and compliance rules via the compliance rules store 330 to each of the represented personas. The management module 127 queries virtual machine characteristics and operating systems of each persona, compiles the rules and policies, and pushes the compiled rules and policies to the user devices based on the results of query. The policies and rules are stored in their respective persona rules stores 305A and 305B. The persona rules stores 305A and 305B manage their respective personas regarding implemented mobile device management policies set to monitor and regulate the user device 103. In some embodiments, a personal persona may not receive any compliance rules, data, or the like if that given persona is not managed or controlled by the MDMS 121 or MDM central module 122. Additionally, with a lack of compliance rules and policies, persona 1 115 maintains the ability to access third-party data, uninhibited usage, and freedom of functionality as desired by end users enrolled in BYOD programs. In this way, true segregations between personas can occur in a way not previously contemplated. Further, persona 2 118 may store enterprise compliance policies in the persona 2 rule store 305B, enforcing consistent enterprise persona functionality and maintaining secure access and distribution of enterprise content.

Also illustrated in FIG. 3, some embodiments of the management module 127 send configuration policies and compliance rules to an overarching agent, the persona management module 245, which configures the virtual machines based on those rules and policies. As previously discussed, one function of the persona management module 245 is to delegate policies, rules, data access, and persona functionality to the subordinate personas.

Still referring to FIG. 3, in some embodiments shown, content assigned to personas is stored either in the personal content repository 333 or in the enterprise content repository 336 and both may be accessed through the content server 130. In an alternate embodiment, personal content on the user device 103 is not accessible by the MDMS 121. According to another embodiment, an administrator can distribute documents through the content server 130 coupled to the management module 127 to the content repositories.

Rules and policies assigned to personas dictate persona interaction with content repositories, including third-party content repositories. In some embodiments, communication is generally sent through the content server 130; hence, the content server 130 verifies whether the communication transmitted to a given persona is permissible. For example, if the content store 345 included an enterprise Share Point site, the enterprise persona may possess policies granting access to the third-party content server 142 and the enterprise content 336 repository. Persona 2 (the enterprise persona), may initially "shake hands" with the content server 142 and the content server may authenticate the credentials of persona 2 118. Consequently, persona 2 118 may fetch a document from the content store 345, save said document in memory 2 222B, and/or in the persona 2 content store 3118, modify said document, and transfer it to the enterprise content 336 repository.

Still referring to FIG. 3, in some embodiments a secure email gateway 133 may be incorporated in the MDM central module 122 and may comprise a proxy server between the enterprise email server (e.g. Microsoft Exchange) and the data network. According to compliance rules and policies, an enterprise persona may retrieve email from the enterprise email through the secure email gateway 133. The secure email gateway 133 may be configured to perform compliance checks against entities wishing to access enterprise email. The management module 127 is also integrated with the secure email gateway 133. An administrator through the management console can push compliance rules to the secure email gateway 133 to change authentication requirements; thereby, storing said compliance rules in the compliance rule check 339. In another example embodiment, the secure email gateway can determine whether a user device 103 is "jail broken". An enterprise persona may retain appropriate compliance rules permitting access to the enterprise email, but the secure email gateway 133 will still restrict access to that persona if the user device 103 is jail broken. Further, an enterprise may allow access to predetermined third-party email gateways 148, whereby the secure email gateway 133 will assess a persona's compliance rules, allow secure access to a third-party email gateway 148, and subsequently permit admittance to a third-party email store 348.

Many companies enable employees to utilize productivity applications (apps) to facilitate work demands. Some embodiments of the MDM central module 122 include an application catalog 136 for managing the applications of end users 109. In some embodiments, a graphical user interface 342 enables interaction with the application catalog 136 and provides an interface, such as a website or the like, presenting users with a list of authorized applications for chosen personas. In another embodiment, an application portal resident on a user device 103 comprises a host of authorized downloadable apps. In some embodiments, the application catalog 136 receives compliance rules and policies set by an administrator via the management module 127. The application catalog 136 may provide access to public application stores 145 such as Google Play or the Apple Store. In some embodiments, the application catalog 136 may contain links to public apps recommended for employee productivity. Alternatively, the enterprise persona may have policies permitting retention of all public apps or retention of specifically designated public applications.

In some embodiments, the application catalog 136 may comprise enterprise applications developed specifically for a company and may preclude access to such enterprise applications by a personal persona 115. In some embodiments, the application catalog authenticates a persona's credentials before permitting a download of enterprise apps. In another embodiment, a user can pull enterprise content 336 through the content server 130 and modify it using annotation features within a secure content application. In some embodiments, the persona app stores 309A and 309B comprise applications downloaded from the application store 351 for their respective personas.

Furthermore, one example embodiment of the present device may provide a lost device persona. A user device 103 may switch to a lost persona if the device moves outside of a recognized pattern as determined by GPS, or the user device 103 recognizes a period of inactivity, or exhibits some other atypical behavior. In some embodiments, the GPS system will actively track and keep a dynamic record of each user's travel routine and, in the event of an identified deviation, automatically toggle to the lost persona. The lost persona may, for example, comprise settings and/or configuration information that may facilitate locating the device. For example, toggling the lost persona may cause one or more location services on the user device 103 to be engaged, such as a GPS coordinate transmission mode or the like. In some embodiments, if the user device 103 is in the lost device persona, authentication may be required to toggle back to a managed user persona. For example, authentication may occur by inputting biometric metadata, a PIN or password, a programmable swipe gesture, or any similar authentication means. In another embodiment, the device may also toggle to the lost device persona if initiated by the user or an administrator via the self-service application of the management module 127 (i.e., the user identifies the device as lost and sends instructions to the device indicating the same). The self-service application of the management module 127 may contain a map add-on or a map software application in which the user and/or the administrator may utilize to find lost user devices. The lost device persona offers additional security for enterprises and users who wish to keep access, devices, and content secure.

As described previously, in one example embodiment, the user device 103 may contain multiple physical hardware sets within the user device. Each hardware set generally represents a separate and independent persona. The embodiment comprising multiple physical hardware sets within a single user device 103 generally functions in a similar manner as embodiments of the device embedded with virtual machines. Further descriptions regarding functionality of both embodiments will be described in connection with FIGS. 6, 7, and 8.

Referring to FIGS. 4A, 4B, and 4C an embodiment of a dual persona device 103 having two screens 118 and 115 is shown. In one embodiment shown, a different display/screen is assigned to each persona and generally comprises the active display while a user interacts with the corresponding persona. For example, when using enterprise persona 118, the enterprise screen 118 will be illuminated and active while the personal persona 115 will be dim and visibly inactive. In some embodiments, a user device 103 may comprise two separate screens 118, 115 on one user device 103; hence, the given screen a user is utilizing dictates the presently active persona. In an example illustrated in FIGS. 4A and 48, an enterprise persona 118 is active on one screen 409A, and is presented on one side of user device 103. Likewise illustrated in FIGS. 4A and 4C, a personal persona 115 is presented on the opposing side of the user device 103. A user, depending on which persona he or she wishes to engage, utilizes the side and screen 409B of the user device 103 embodying the desired persona.

In some embodiments, the dual displays may optionally comprise dual cameras on the user device 103 and may be used to present an augmented reality experience. Using the dual cameras on either side of the device, one screen may display what the camera on the opposing side views. For example, the screen may show the inside of the user's hand or images of the environment he/she is in, lending the impression there is no user device or the user device 103 is see-through. Further, the camera may incorporate technology that will automatically dim or turn off the backlight of the persona not in use based on identifiable features, such as the palm of a user's hand or recognizing a face in front of the camera. The cameras may recognize the lack of light and dim the screens such as when the user device 103 is in a pocket or handbag.

FIG. 4D illustrates another embodiment of the present dual persona device 103. The embodiment shown includes one display possessing the ability to express one persona at a time or multiple personas simultaneously. As shown, a single display may be divided into halves representing a different persona on either side. In another embodiment, a border of the screen may be an alternative color representing a second screen, which may change and become active when the personas toggle. The device may indicate the active persona by displaying a persona identifier in small font at the top of the screen. In another embodiment, if the inactive persona receives a call, the screen may divide in half as shown in FIG. 4D, indicating a trigger event. The personas may be exchanged by touching or acknowledging the portion of the screen that represents the incoming persona.

In various embodiments, personas may be identified and/or delineated in a variety of ways. For example, according to some embodiments of the present disclosure, each persona may have a distinct and distinguishable ringtone. Persona display backgrounds may also change when toggling personas. For example, an enterprise persona may display a company logo as a background, while a personal persona may display a personal picture of the user. Within multiple persona device management, all of the disclosed embodiments may be incorporated on the user device 103 or some combination of embodiments thereof. Further, the described examples are not intended to limit the spirit or scope of the present disclosure. As will be understood and appreciated by one of ordinary skill in the art, other embodiments may be implemented to distinguish between multiple personas on a single user device 103.

As previously described, a persona generally relates to a collection of settings implemented in software and/or hardware that can be switched in and/or on a user device 103 based on a trigger event. As shown in FIG. 5, a plurality of personas interact with a persona management module 245 and various incorporated hardware components, either via the operating system (or excluding the operating system) to communicate and execute commands.

The central module (management module) 122 enables personas to be selected, communication rules and policies to be assigned to the personas within the user device 103, and personas to interact within the limits of the selected rules and policies. In some embodiments, the personas are able to interact with each other (e.g. share data, share contacts, etc.). Conversely, in another embodiment, the personas remain segregated with no communication between the two (or multiple). While personas may incorporate individual contact lists, in some embodiments, it may possible for a communal contact list accessible to any persona embedded on the user device 103.

In some embodiments, toggling between personas may be executed via physical gestures that are recognized by the assimilated hardware and software in the user device 103. In some embodiments, flipping me user device 103 over creates an identical replica of the user device 103 with a second display on the other side. In another embodiment, consecutive flipping of the user device 103 may cycle through embedded personas. An accelerometer or some other user device position detecting mechanism integrated in the hardware may be used to sense the rotation of the user device 103. The hardware communicating via the operating system to a persona management module 245 expresses that the user has initiated a change in persona and the persona management module will activate another persona. Likewise, initiating a change in persona may be executed by flipping or rotating the user device 103 a set number of multiple rotations for each toggle. In another embodiment, a user with persona 1 501 active may shake the user device 103 a preset number of times. The shakes are recognized by die hardware and the hardware communicates with the persona management module 245 thereby switching the active persona to persona 2 503 (or some other persona).

According to various other embodiments, a plurality of gestures or actions may toggle between multiple personas. Toggling of personas may occur by holding down a button one the user device 103 for a set period of time, or depressing said button a number of times. The device may have a specifically designated button that may be used exclusively for the purpose of toggling personas. Another example embodiment utilizes swiping gestures at the top or bottom of the screen on the user device 103 to toggle through personas.

As generally understood by one of ordinary skill in the art, many user devices 103 feature embedded GPS components in the device hardware that are used to identify the position of a user device 103 whenever the device is powered on. According to some embodiments, persona 1 501 may be geolocation-based, such that persona 1 501 is active when a user device 103 is within a given distance of a designated location. In one aspect, a user device 103 switches virtual or physical SIMs assigned to different personas. Further, when the user is traveling abroad, a user device 103 may switch to a SIM appropriate for the visiting region, thereby receiving cheaper rates based on local service.

In another embodiment, persona 2 may be active during an established window of time on given days. For example, persona 2 502 (an enterprise persona) may be active Monday through Friday during normal business hours and persona 1 501 (a personal persona) maybe the active persona otherwise. User selection is also an option for selecting a persona, wherein the user device 103 prompts a user 109 to specify which persona is requested, followed by a PIN or password input into the device and processed by the persona management module 245 to access the requested persona. In another embodiment, the persona management module 245 may require biometric data such as a fingerprint or a user's voice to toggle personas, or may use an electronic fob or watch (e.g., electronic timepiece) having near field communication (NFC) capability or other similar communication capability to toggle personas.

According to another aspect in this regard, the persona management module 245 may utilize signals from a fingerprint reader such as that provided in the Apple® iPhone 5S, or other similar biometric device, to toggle personas. For example, different fingers may be used to toggle to, or switch between, different personas. A right thumbprint may correspond to a trigger actuation of a work persona, while a left thumbprint may correspond to and trigger actuation of a personal persona. Likewise, a work-related electronic fob may correspond to and trigger actuation of a work persona, and a digital watch may correspond to and trigger actuation of a personal persona, for example upon removal of the work-related fob from proximity of the device, such that the personal persona triggering device remains within the operative proximity.

Still referring to FIG. 5 and according to some embodiments, a trigger or triggering event may cause a switch or toggle through represented personas. In some embodiments, a trigger forces or prompts a user to choose an active persona (e.g., an incoming phone call designated for an inactive persona wherein a user can choose to ignore or accept the call). In some embodiments, a default persona may be set to receive all phone calls. However, a user may also be prompted to select which persona will be used to accept an incoming call. In another embodiment, personas may be associated with different phone numbers recognized by the persona management module 245, which directs incoming calls to the appropriate persona either persona based on the recognized number. In yet another embodiment, an administrator may decide and implement via the MDMS 121 the most secure persona to accept an incoming call.

FIG. 6 is a flow chart setting forth the general steps involved in a policy creation and deployment method 600 consistent with embodiments of this disclosure for providing assignment of compliance rules and policies to a user device and/or persona(s) by an administrator. As will be understood and appreciated, method 600 may be implemented using a MDMS 121, the management module 127 within a MDM central module 122, a data network 154, persona rules stores 305A and 305B, and a user device 103, and various other components and modules as described above. Ways to implement the steps of method 600 will be described in greater detail below. According to some embodiments, method 600 may begin at block 605, where an administrator logs into the MDMS 121 console and accesses the compliance rules store 330 through the management module 127, and queries or selects group of personas to which the given rules or policies will apply. The persona or groups of personas queried may be selected according to different roles and responsibilities or due to enrolling a new employee into the BYOD program etc. In some embodiments, an administrator may query personas implemented on virtual machines, hardware sets, or operating systems. After the desired persona(s) ere found, method 600 moves to step 607, at which point the desired persona(s) are selected.

According to some embodiments, at step 609, the administrator defines the rules to be implemented for the selected personas. For example, rules might include access to secure email gateways 133, content servers 130, application catalogs 136, etc. In other embodiments, default rules will apply. Once rules and policies have been designated, the administrator initiates the process of deploying the rules to the respective personas.

At step 611 of process 600, rules defined by the administrator are compiled within the management module 127 based on operating systems of given personas. In some embodiments, the management module 127 interacts with the MDM database 139 to assemble definitions representing the administrator defined rules and policies. After compiling the rules, the compiled rules and policies are deployed to the selected personas (step 613). In some embodiments, data is received from the user device at step 615. This data may include authentication checks, acknowledgement of enrollment, a server ping, etc. In certain embodiments, the management module 127 may receive data from the user device comprising acknowledgment of deployed rules and policies, a request for further instructions, etc. In some embodiments, method 600 moves to the next step 617 and pushes commands back to the user devices and personas based on the received data and/or rules.

FIG. 7 is a flow chart setting forth the general steps involved in a persona initiation process 700 from a user device 103 perspective. Generally, method 700 follows the steps of process 600, but from a persona perspective on a user device 103. In some embodiments, method 700 may be implemented using a persona management module 245, a data network 154, a mobile device management system 121, a MDM database 139, a MDM central module, a compliance rules store 330 embedded in a management module 127, and other systems described herein. Ways to implement method 700 will be described in greater detail below. In some embodiments, method 700 may begin at step 705, wherein a user requests enrollment into a mobile device management system. The enrollment request generally leaves the user device 103 and the request is sent over the data network 154 and is received and accepted by the management module 127.

According to some embodiments, die management module 127 deploys the already compiled rules via the data network 154 to the user device 103. Successively, the compiled rules and policies are received at the user device 103. Method 700 progresses to the next step 709, where the compiled rules and policies are implemented on the user device 103 in association with the appropriate persona. In some embodiments, various rules are associated with respective personas.

At step 711, after the given rules and policies have been implemented on each respective persona, the user device 103 containing multiple embedded personas is able to toggle between personas. As data is received at the given device 103 during operation, the device identifies and acknowledges data based on the compiled rules and policies designated for the individual persona (step 715). In some embodiments at step 715, the persona/device can utilize one or both of two different paths; it can relay necessary data back to the console (step 713) or take some action based on the rules and/or data (step 717). This data could be an acknowledgement of receipt sent over the data network 154 back to the management module 127 and thereby ending the process. As described, the persona can take a specific action based on the rules or data applied to the persona (step 717).

FIG. 8 is a flow chart setting forth the general steps involved in a method 800 consistent with embodiments of this disclosure of toggling personas by either user initiation or an event trigger. In some embodiments, method 800 may be implemented utilizing a user device 103, a persona management module 245, a data network 154, one or more processors one a device, one or more displays on a device, and other components as described above. Ways to implement the steps of method 800 will be described in greater detail below. According to some embodiments, method 800 begins at a state in which the user device is in a steady state within a given persona. At step 805, a user desires to access a persona or an event trigger occurs to access a given persona. Moving to step 807, an overarching entity such as embedded software, firmware, or a persona management module 245 performs an initial compliance check regarding the forthcoming persona, ensuring the persona is a managed persona. In some embodiments, the persona is not a managed persona, and the user device 103 stays in its initial state. In another embodiment, the device is in a managed persona and method 800 progresses to step 809.

Step 809 optionally requires user device 103 authentication to proceed to the next stage. According to various embodiments, authentication can be performed utilizing a plurality of processes such as a fingerprint scan, entering a PIN or password, swiping a specific pattern on the screen, a biometric access functionality, or the device may be configured for an automatic authorization without user input. If the authentication fails, method 800 propagates to step 810, wherein a deny access or error message is displayed and the user device returns to the start state. If user authentication is successful, method 800 proceeds to step 811 and allows access to the managed and requested persona.

According to some embodiments at stage 813, the newly activated persona may require actions to be taken based on predetermined rules or receiving a set of data. For example, email communications may need to be sent to the persona at issue from the MDMS 121. If so, then an indicator or identifier may be associated at the MDM database 139 with the data to be sent to the mobile device persona, and subsequently the data will be sent to the device. At step 817, the persona waits for a trigger event to change personas. If a trigger event does not occur, the device will return to step 813 and repeat steps 813-817 as necessary. If a trigger is received, the device will propagate to step 819, which is analogous to step 807.

In some embodiments at step 819, the device checks if the trigger is from a managed persona. If the trigger is from a managed persona, method 800 advances to step 809. In another embodiment, if the trigger Is not from another managed persona, the device will move to step 821, may cease monitoring the managed persona, and may disable communication, ending method 800.

As has been described, and according to some embodiments, the present disclosure generally describes methods and systems for isolating, implementing, and provisioning multiple entities or personas on an individual user device, thus enabling multiple individual end-user environments to remain quarantined while simultaneously remaining active. As will be generally understood, a persona encompasses various settings, policies, rules, configurations or attributes associated with a particular end user environment. Accordingly, groups of individual personas may be categorized based on defined rules and policies applicable to said group and managed simultaneously. Other embodiments enable remote access to deploy changes to current attributes and configurations either by group definition or on an individual basis.

According to one example embodiment, multiple personas may be managed via a central server (e.g., a content server or management module), which may serve as an intermediary between the multiple personas. The central server receives data from the device, identifies which persona initiated the data transfer, and sends the data on behalf of the identified persona. Similarly, the central server receives data from outside sources, identifies for which persona the data is intended and pushes said data to the appropriate persona. Further, one example embodiment virtually separates one set of hardware components (e.g., a single processor, memory, battery, etc.) into individual segments. Consequently, each segment houses and embodies a separate and quarantined persona. Yet other embodiments encompass multiple hardware sets (e.g., multiple processors, multiple memories, multiple batteries, etc.) independently coupled and dedicated for one or more respective persona.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium, which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may lake the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single Integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    configuring a first end-user environment in a device, wherein the first end-user environment stores data in association with a first subscriber identity module (SIM) persona on the device;
    configuring a second end-user environment in the device, wherein the second end-user environment stores data in association with a second SIM persona on the device, and the second end-user environment is remotely managed over a network by a management system, wherein configuring the second end-user environment comprises generating a plurality of compliance rules based on an operating system executed by the second end-user environment;
    identifying a trigger event from the device at an instance in which the device is actively operating the first end-user environment;
    verifying authorization of the device to access the second end-user environment;
    causing the device to switch to the second end-user environment in an instance in which the device has been verified as having the authorization to access the second end-user environment, wherein the second end-user environment is configured to enforce the plurality of compliance rules for the operating system executed by the second end-user environment; and
    in response to receiving a request from the device to access a network resource from the device, determining a level of content access that the device has for the network resource based at least in part on an active use of the second end-user environment and based at least in part on an authorization credential associated with the device and associated with a user group, wherein the authorization credential indicates the level of content access for the network resource for a respective member of the user group.

2. The method of claim 1, further comprising:
    determining that the second end-user environment is managed by the management system prior to verifying the authorization of the device to access the second end-user environment.

3. The method of claim 1, wherein verifying authorization of the device to access the second end-user environment further comprises at least one of performing a biometric scan or detecting a user-gesture on a display of the device.

4. The method of claim 1, wherein the first SIM persona or the second SIM persona comprises at least one of: a physical SIM card, a virtual SIM card entity, or a virtual entity embedded on the device.

5. The method of claim 1, wherein the device comprises a first device, and at least one of the first SIM persona or the second SIM persona is transferable to a second device.

6. The method of claim 1, further comprising:
while actively operating in the first end-user environment, routing email communication received by the device to the second end-user environment based on a detection of a SIM persona address, wherein the email communication is inaccessible from the first end-user environment.

7. The method of claim 1, further comprising:
causing the device to switch to a third end-user environment that facilitates locating the device in an instance in which the device has deviated from a pattern of locations associated with the device, wherein the deviation from the pattern of locations is determined based on location system data.

8. A system, comprising:
a computing device that comprises a processor and memory; and
program instructions executable in the computing device that, when executed by the computing device, cause the computing device to at least:
configure a first end-user environment in the computing device, wherein the first end-user environment stores data in association with a first subscriber identity module (SIM) persona on the computing device;
configure a second end-user environment in the computing device, wherein the second end-user environment stores data in association with a second SIM persona on the computing device, and the second end-user environment is remotely managed over a network by a management system, wherein configuring the second end-user environment comprises generating a plurality of compliance rules based on an operating system executed by the second end-user environment;
identify a trigger event from the computing device at an instance in which the computing device is actively operating the first end-user environment;
verify authorization of the computing device to access the second end-user environment;
cause the computing device to switch to the second end-user environment at in instance in which the computing device has been verified as having the authorization to access the second end-user environment, wherein the second end-user environment is configured to enforce the plurality of compliance rules for the operating system executed by the second end-user environment; and
in response to receiving a request from the device to access a network resource from the device, determine a level of content access that the device has for the network resource based at least in part on an active use of the second end-user environment and based on an authorization credential associated with the device and associated with a user group, wherein the authorization credential indicates the level of content access for the network resource for a respective member of the user group.

9. The system of claim 8, wherein the program instructions are further configured to cause the computing device to at least:
determine that the second end-user environment is managed by the management system prior to verifying the authorization of the computing device to access the second end-user environment.

10. The system of claim 8, wherein the trigger event comprises an incoming phone call received by the computing device.

11. The system of claim 8, wherein the verification of the authorization comprises performing a biometric scan or detecting a user-gesture on a display of the computing device.

12. The system of claim 8, wherein the first SIM persona or the second SIM persona comprises at least one of: a physical SIM card, a virtual SIM card entity, or a virtual entity embedded on the computing device.

13. The system of claim 8, wherein the system comprises a first system, and at least one of the first SIM persona or the second SIM persona is transferable to a second system.

14. The system of claim 8, wherein the program instructions are further configured to cause the computing device to at least:
route, while actively operating in the first end-user environment, email communication received by the computing device to the second end-user environment based on a detection of an identifier associated with the email communication, wherein the email communication is inaccessible from the first end-user environment.

15. The system of claim 8, wherein the program instructions are further configured to cause the computing device to at least:
switch to a third end-user environment that facilitates locating the system in an instance in which the system has deviated from a pattern of locations associated with the system, wherein the deviation from the pattern of locations is determined based on location system data.

16. A non-transitory computer-readable medium comprising executable instructions which, when executed by a computing device, cause the computing device to at least:
configure a first end-user environment in the computing device, wherein the first end-user environment stores data in association with a first subscriber identity module (SIM) persona on the computing device;
configure a second end-user environment in the computing device, wherein the second end-user environment stores data in association with a second SIM persona on the computing device, and the second end-user environment is remotely managed over a network by a management system, wherein configuring the second end-user environment comprises generating a plurality of compliance rules based on an operating system executed by the second end-user environment;
identify a trigger event from the computing device at an instance in which the computing device is actively operating the first end-user environment;
verify authorization of the computing device to access the second end-user environment;
cause the computing device to switch to the second end-user environment in an instance in which the computing device has been verified as having the authorization to access the second end-user environment, wherein the second end-user environment is configured to enforce the plurality of compliance rules for the operating system executed by the second end-user environment; and
in response to receiving a request from the device to access a network resource from the device, determine a level of content access that the device has for the network resource based at least in part on an active use of the second end-user environment and based on an authorization credential associated with the device and associated with a user group, wherein the authorization credential indicates the level of content access for the network resource for a respective member of the user group.

17. The non-transitory computer-readable medium of claim 16, wherein the first SIM persona or the second SIM persona comprises at least one of: a physical SIM card, a virtual SIM card entity, or a virtual entity embedded on the computing device.

18. The non-transitory computer-readable medium of claim 16, wherein the computing device generates the plurality of compliance rules based on the operating system executed for the second SIM persona.

19. The non-transitory computer-readable medium of claim 16, wherein verifying authorization of the device to access the second end-user environment is based on confirming that the second end-user environment is managed by the management system and based on a user credential.

* * * * *